United States Patent
Guo et al.

(10) Patent No.: US 9,535,960 B2
(45) Date of Patent: Jan. 3, 2017

(54) CONTEXT-SENSITIVE SEARCH USING A DEEP LEARNING MODEL

(71) Applicant: Microsoft Corporation, Redmond, WA (US)

(72) Inventors: Chenlei Guo, Redmond, WA (US); Jianfeng Gao, Woodinville, WA (US); Ye-Yi Wang, Redmond, WA (US); Li Deng, Redmond, WA (US); Xiaodong He, Issaquah, WA (US)

(*) Notice: Subject to any disclaimer, the term of this patent is extended or adjusted under 35 U.S.C. 154(b) by 200 days.

(21) Appl. No.: 14/252,703

(22) Filed: Apr. 14, 2014

(65) Prior Publication Data

US 2015/0293976 A1 Oct. 15, 2015

(51) Int. Cl.
*G06F 17/30* (2006.01)
*G06N 3/04* (2006.01)

(52) U.S. Cl.
CPC ..... *G06F 17/30554* (2013.01); *G06F 17/3053* (2013.01); *G06F 17/30867* (2013.01); *G06N 3/0454* (2013.01)

(58) Field of Classification Search
CPC .............. Y10S 707/99933; Y10S 707/99936; G06F 17/30657; G06F 17/30731; G06F 17/30734; G06F 17/3053; G06F 17/30867; G06Q 30/0255; G06Q 50/205; G06N 3/0454; G10L 25/30; G05B 23/0229; G09B 5/00; G09B 5/06; G09B 7/02
USPC ....................................................... 707/706
See application file for complete search history.

(56) References Cited

U.S. PATENT DOCUMENTS

| | | |
|---|---|---|
| 6,701,318 B2 | 3/2004 | Fox et al. |
| 7,685,084 B2 | 3/2010 | Sisk et al. |
| 7,716,216 B1 | 5/2010 | Harik et al. |
| 7,840,569 B2 | 11/2010 | Meyerzon et al. |
| 8,229,948 B1 | 7/2012 | Ershov |
| 8,266,144 B2 | 9/2012 | Tankovich et al. |

(Continued)

FOREIGN PATENT DOCUMENTS

WO 2013121181 A1 8/2013

OTHER PUBLICATIONS

PCT Search Report and Written Opinion for PCT/US2015/024417, mailed on Jun. 18, 2015, 10 pages.

(Continued)

*Primary Examiner* — Thanh-Ha Dang
(74) *Attorney, Agent, or Firm* — Steven Spellman; Tom Wong; Micky Minhas

(57) ABSTRACT

A search engine is described herein for providing search results based on a context in which a query has been submitted, as expressed by context information. The search engine operates by ranking a plurality of documents based on a consideration of the query, and based, in part, on a context concept vector and a plurality of document concept vectors, both generated using a deep learning model (such as a deep neural network). The context concept vector is formed by a projection of the context information into a semantic space using the deep learning model. Each document concept vector is formed by a projection of document information, associated with a particular document, into the same semantic space using the deep learning model. The ranking operates by favoring documents that are relevant to the context within the semantic space, and disfavoring documents that are not relevant to the context.

20 Claims, 12 Drawing Sheets

(56) References Cited

U.S. PATENT DOCUMENTS

| | | | |
|---|---|---|---|
| 8,321,431 B2* | 11/2012 | Quick | G06F 17/3087 |
| | | | 707/754 |
| 8,359,282 B2 | 1/2013 | Bai et al. | |
| 8,392,436 B2 | 3/2013 | Bai et al. | |
| 8,504,361 B2* | 8/2013 | Collobert | G06F 17/277 |
| | | | 704/232 |
| 9,047,283 B1* | 6/2015 | Zhang | G06F 17/30663 |
| 2002/0129015 A1* | 9/2002 | Caudill | G06F 17/3069 |
| 2005/0004905 A1 | 1/2005 | Dresden | |
| 2005/0278362 A1* | 12/2005 | Maren | G06N 5/025 |
| 2006/0026013 A1* | 2/2006 | Kraft | G06Q 10/10 |
| | | | 705/1.1 |
| 2006/0277033 A1 | 12/2006 | Gao et al. | |
| 2007/0124263 A1 | 5/2007 | Katariya et al. | |
| 2007/0136281 A1 | 6/2007 | Li et al. | |
| 2007/0203869 A1 | 8/2007 | Ramsey et al. | |
| 2008/0140644 A1* | 6/2008 | Franks | G06F 17/30817 |
| 2008/0243820 A1 | 10/2008 | Chang et al. | |
| 2009/0019034 A1* | 1/2009 | Franks | G06F 17/30017 |
| 2009/0125501 A1 | 5/2009 | Gao et al. | |
| 2009/0259651 A1 | 10/2009 | Tankovich et al. | |
| 2009/0276414 A1 | 11/2009 | Gao et al. | |
| 2009/0282022 A1* | 11/2009 | Bennett | G06F 17/30675 |
| 2010/0153315 A1* | 6/2010 | Gao | G06F 17/3053 |
| | | | 706/12 |
| 2010/0161641 A1* | 6/2010 | Gustafson | G06F 17/30672 |
| | | | 707/759 |
| 2010/0250547 A1* | 9/2010 | Grefenstette | G06F 17/30867 |
| | | | 707/740 |
| 2010/0318531 A1 | 12/2010 | Gao et al. | |
| 2011/0208709 A1 | 8/2011 | Holthausen | |
| 2011/0208735 A1 | 8/2011 | Gao et al. | |
| 2011/0270604 A1 | 11/2011 | Qi et al. | |
| 2011/0276390 A1 | 11/2011 | Li et al. | |
| 2011/0276599 A1* | 11/2011 | Connor | G06F 17/3064 |
| | | | 707/780 |
| 2012/0036015 A1 | 2/2012 | Sheikh | |
| 2012/0158621 A1 | 6/2012 | Bennett et al. | |
| 2012/0233160 A1* | 9/2012 | Koomullil | G06F 17/30716 |
| | | | 707/728 |
| 2012/0254217 A1 | 10/2012 | Ali et al. | |
| 2012/0254218 A1 | 10/2012 | Ali et al. | |
| 2013/0103493 A1 | 4/2013 | Gao et al. | |
| 2013/0124492 A1 | 5/2013 | Gao et al. | |
| 2013/0159320 A1 | 6/2013 | Gao et al. | |
| 2013/0166303 A1* | 6/2013 | Chang | G06F 17/30787 |
| | | | 704/258 |
| 2013/0239006 A1 | 9/2013 | Tolkachev | |
| 2014/0279773 A1* | 9/2014 | Chen | G06N 3/08 |
| | | | 706/20 |
| 2015/0074027 A1* | 3/2015 | Huang | G06N 3/0454 |
| | | | 706/25 |

OTHER PUBLICATIONS

Wang, et al., "Explore Click Models for Search Ranking," In Proceedings of the 19th ACM International Conference on Information and Knowledge Management, Oct. 2010, 4 pages.

"Researchers predict click-through behavior in Web searches," retrieved at <<http://news.psu.edu/story/178742/2009/03/11/researchers-predict-click-through-behavior-web-searches>>, In Penn State News, Mar. 11, 2009, 2 pages.

Bengio, Yoshua, "Learning Deep Architectures for AI," In Foundations and Trends in Machine Learning, vol. 2, Issue 1, 2009, 130 pages.

Blei, et al., "Latent Dirichlet Allocation," In Journal of Machine Learning Research, vol. 3, Mar. 2003, 30 pages.

Brown, et al., "The Mathematics of Statistical Machine Translation: Parameter Estimation," In Computational Linguistics, vol. 19, Issue 2, Jun. 1993, 50 pages.

Burges, et al., "Learning to Rank using Gradient Descent," In Proceedings of the 22nd International Conference on Machine Learning, 2005, 8 pages.

Collobert, et al., "Natural Language Processing (Almost) from Scratch," In the Journal of Machine Learning Research, vol. 12, Feb. 2011, 45 pages.

Dahl, et al., "Context-Dependent Pre-Trained Deep Neural Networks for Large-Vocabulary Speech Recognition," In IEEE Transactions on Audio, Speech, and Language Processing, vol. 20, Issue 1, Jan. 2012, 13 pages.

Deerwester, et al., "Indexing by Latent Semantic Analysis," In Journal of the American Society for Information Science, vol. 41, Issue 6, Sep. 1990, 34 pages.

Dumais, et al., "Automatic Cross-Linguistic Retrieval Using Latent Semantic Indexing," In Proceedings of AAAI Spring Symposium Series: Cross-Language Text and Speech Retrieval, Mar. 1997, 7 pages.

Gao, et al., "Clickthrough-Based Translation Models for Web Search: from Word Models to Phrase Models," In Proceedings of the 19th ACM International Conference on Information and Knowledge Management, Oct. 2010, 10 pages.

Gao, et al., "Clickthrough-Based Latent Semantic Models for Web Search," In Proceedings of the 34th International ACM SIGIR Conference on Research and Development in Information Retrieval, Jul. 2011, 10 pages.

Gao, et al., "Smoothing Clickthrough Data for Web Search Ranking," In Proceedings of the 32nd International ACM SIGIR Conference on Research and Development in Information Retrieval, Jul. 2009, 8 pages.

Girolami, et al., "On an Equivalence between PLSI and LDA," In Proceedings of the 26th Annual International ACM SIGIR Conference on Research and Development in Information Retrieval, Jul. 2003, 3 pages.

Hinton, et al., "Deep Neural Networks for Acoustic Modeling in Speech Recognition," In Magazine of IEEE Signal Processing, Nov. 2012, 16 pages.

Hinton, et al., "Discovering Binary Codes for Documents by Learning Deep Generative Models," In Proceedings of Topics in Cognitive Science, 2010, 18 pages.

Hofmann, Thomas, "Probabilistic Latent Semantic Indexing," In Proceedings of the 22nd Annual International ACM SIGIR Conference on Research and Development in Information Retrieval, Aug. 1999, 8 pages.

Jarvelin, et al., "IR Evaluation Methods for Retrieving Highly Relevant Documents," In Proceedings of the 23rd Annual International ACM SIGIR Conference on Research and Development in Information Retrieval, Jul. 2000, 8 pages.

Li, et al., "Very Sparse Random Projections," In Proceedings of the 12th ACM SIGKDD International Conference on Knowledge Discovery and Data Mining, Aug. 20, 2006, 10 pages.

Platt, et al., "Translingual Document Representations from Discriminative Projections," In Proceedings of the Conference on Empirical Methods in Natural Language Processing, Oct. 2010, 11 pages.

Salakhutdinov, et al., "Semantic Hashing," In IRGM Workshop at the SIGIR Conference, Jun. 2007, 8 pages.

Socher, et al., "Semantic Compositionality through Recursive Matrix-Vector Spaces," In Proceedings of the Joint Conference on Empirical Methods in Natural Language Processing and Computational Natural Language Learning, Jul. 2012, 11 pages.

Svore, et al., "A Machine Learning Approach for Improved BM25 Retrieval," In Proceedings of the 18th ACM Conference on Information and Knowledge Management, Nov. 2009, 4 pages.

Wei, et al., "LDA-based Document Models for Ad-hoc Retrieval," In Proceedings of the 29th Annual International ACM SIGIR Conference on Research and Development in Information Retrieval, Aug. 2006, 8 pages.

Yih, et al., "Learning Discriminative Projections for Text Similarity Measures," In Proceedings of the Fifteenth Conference on Computational Natural Language Learning, Jun. 2011, 10 pages.

Zeiler, et al., "Adaptive Deconvolutional Networks for Mid and High Level Feature Learning," In IEEE International Conference on Computer Vision, Nov. 2011, 8 pages.

Konig, et al., "Nonlinear Discriminant Feature Extraction for Robust Text-Independent Speaker Recognition," In Proceedings of the RLA2C, 1998, 4 pages.

(56) References Cited

OTHER PUBLICATIONS

Heck, et al., "Robustness to telephone handset distortion in speaker recognition by discriminative feature design," In Speech Communication, vol. 31, Elsevier Science B.V., 2000, 12 pages.
Diamantaras, K. I., Principal Component Neural Networks: Theory and Applications, Wiley-Interscience publishers, 1st Edition, Mar. 1996, Amazon.com product page only, retrieved at <<http://www.amazon.com/Principal-Component-Neural-Networks-Communications/dp/0471054364>>, retrieved on Aug. 8, 2013, 4 pages.
Neural Networks: Tricks of the Trade, Springer publishers, Montavon, et al. (Eds.), 2nd Edition, Nov. 2012, Amazon.com product page only, retrieved at <<http://www.amazon.com/Neural-Networks-Lecture-Computer-Theoretical/dp/364235288X>>, retrieved on Aug. 8, 2013, 4 pages.
Song, et al., "Adapting Deep RankNet for Personalized Search," In Proceedings of the 7th ACM International Conference on Web Search and Data Mining, Feb. 24, 2014, 10 pages.
Chen, et al., "Small-Footprint Keyword Spotting Using Deep Neural Networks," available at <<http://old-site.clsp.jhu.edu/~guoguo/papers/chen2014small.pdf, accessed on Mar. 3, 2014, 5 pages.
Volkovs, Maksims N., "Context Models for Web Search Personalization," available at <<http://www.cs.toronto.edu/~mvolkovs/yandex_kaggle_model.pdf>>, accessed on Mar. 3, 2014, 7 pages.
Berger, et al., "Information Retrieval as Statistical Translation," In Proceedings of the 22nd Annual International ACM SIGIR Conference on Research and Development in Information Retrieval, 1999, 8 pages.
Deng, et al., "A Deep Convolutional Neural Network Using Heterogeneous Pooling for Trading Acoustic Invariance with Phonetic Confusion," In Proceedings of IEEE International Conference on Acoustics, Speech, and Signal Processing, May 2013, 5 pages.
Gao, "Dependence Language Model for Information Retrieval," In Proceedings of the 27th Annual International ACM SIGIR Conference on Research and Development in Information Retrieval, 2004, 8 pages.
He, et al., "Discriminative Learning in Sequential Pattern Recognition," In Proceedings of IEEE Signal Processing Magazine, vol. 25, Issue 5, 2008, 23 pages.
Huang, et al., "Learning Deep Structured Semantic Models for Web Search using Clickthrough Data," In Proceedings of the 22nd ACM International Conference on Information & Knowledge Management, Oct. 27, 2013, 6 pages.
Lu, et al., "A Deep Architecture for Matching Short Texts," In Proceedings of Advances in Neural Information Processing Systems, Dec. 2013, 9 pages.
Metzler, et al., "A Markov Random Field Model for Term Dependencies," In Proceedings of the 28th Annual International ACM SIGIR Conference on Research and Development in Information Retrieval, 2005, 8 pages.
Mikolov, et al., "Linguistic Regularities in Continuous Space Word Representations," In Proceedings of the 2013 Conference of the North American Chapter of the Association for Computational Linguistics: Human Language Technologies, May 2013, 6 pages.
Mikolov, et al., "Distributed Representations of Words and Phrases and their Compositionality," In Proceedings of Advances in Neural Information Processing Systems, Oct. 16, 2013, 9 pages.
Socher, et al., "Semantic Compositionality through Recursive Matrix-Vector Spaces," In Proceedings of the 2012 Joint Conference on Empirical Methods in Natural Language Processing and Computational Natural Language Learning, Jul. 2012, 11 pages.
Song, et al., "A General Language Model for Information Retrieval," In Proceedings of the Eighth International Conference on Information and Knowledge Management, 1999, 6 pages.
Jones, Karen Sparck, "What is the Role of NLP in Text Retrieval?," In Proceedings of Natural Language Information Retrieval Text, 1999, 19 pages.
Tur, et al., "Towards Deeper Understanding: Deep Convex Networks for Semantic Utterance Classification," In Proceedings of IEEE International Conference on Acoustics, Speech, and Signal Processing, Mar. 2012, 4 pages.
Wang, et al., "Multi-Style Language Model for Web Scale Information Retrieval," In Proceedings of the 33rd International ACM SIGIR Conference on Research and Development in Information Retrieval, 2010, 8 pages.
Zhai, et al., "A Study of Smoothing Methods for Language Models Applied to Ad Hoc Information Retrieval," In Proceedings of the 24th Annual International ACM SIGIR Conference on Research and Development in Information Retrieval, 2001, 9 pages.
Mesnil, et al., "Investigation of Recurrent-Neural-Network Architectures and Learning Methods for Spoken Language Understanding," In Proceedings of 14th Annual Conference of the International Speech Communication Association, Aug. 25, 2013, 5 pages.
Wang, et al., "Topical N-Grams: Phrase and Topic Discovery, with an Application to Information Retrieval," In Proceedings of the Seventh IEEE International Conference on Data Mining, 2007, 6 pages.
Maas, eta l., "A Probabilistic Model for Semantic Word Vectors," In NIPS Workshop on Deep Learning and Unsupervised Feature Learning, 2010, 8 pages.
Yih, et al., "Learning Discriminative Projections for Text Similarity Measures," In Proceedings of the Fifteenth Conference on Computational Natural Language Learning, 2011, 10 pages.
Huang, et al., "A Deep Structured Semantic Model Produced Using Click-Through Data," U.S. Appl. No. 14/019,563, filed Sep. 6, 2013, 54 pages.
He, et al., "Convolutional Latent Semantic Models and their Applications," U.S. Appl. No. 14/242,845, filed Apr. 1, 2014, 61 pages.
"Second Written Opinion Issued in PCT Application No. PCT/US2015/024417", Mailed Date: Mar. 14, 2016, 6 Pages.
"International Preliminary Report on Patentability Issued in PCT Application No. PCT/US2015/024417", Mailed Date: Jun. 10, 2016, 7 Pages.

\* cited by examiner

CONTEXT-SENSITIVE SEARCH USING A DEEP LEARNING MODEL

BACKGROUND

A search engine may use a ranking algorithm to rank the relevance of documents with respect to a query input by a user. In many cases, the ranking algorithm provides results which strongly conform to previous search-related behavior by users. For example, consider the illustrative scenario in which a user inputs the search term, "Michael Jordon." The ranking algorithm may provide ranking results that emphasize those documents containing the name of the well-known basketball player, Michael Jordon. This result reflects the fact that the overwhelming majority of users who input the search term "Michael Jordon" are interested in accessing documents pertaining to the basketball player, Michael Jordon. Yet some users who input the name "Michael Jordon" may be interested in exploring other topics of interest, such as work performed by an architect named Michael Jordon. In those scenarios, the search engine may provide users with poor user experience, as the results will contain many documents that are irrelevant in view of the user's actual search intent.

SUMMARY

A search engine is described herein that retrieves information based, in part, on a context in which a query has been submitted. The search engine operates by using a deep learning model to project context information (associated with the context) into a context concept vector in a semantic space. The search engine also projects a plurality of instances of document information (associated with respective documents) into a plurality of document concept vectors in the semantic space. The search engine then compares the context concept vector with each document concept vector to yield a plurality of relevance measures. Each relevance measure reflects a degree of semantic relevance of a particular document to the context of the query. The search engine then ranks the documents based on the relevance measures, among other possible ranking features. From a high-level perspective, the search engine promotes documents that are relevant to the context within the semantic space, and disfavors documents that are not relevant to the context within the semantic space. Overall, the search engine provides more useful search results to the user who has submitted the query.

According to one illustrative aspect, the context information may describe text in proximity to the query within a source document, demographic information regarding the user who has submitted the query, the time at which the query was submitted, the location at which the query was submitted, the prior search-related behavior of the user who has submitted the query, etc., or any combination thereof.

According to another illustrative feature, the deep learning network may correspond to a multilayered (deep) neural network.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for performing a search based on context information associated with submitted queries, by applying a deep learning model. Section B sets forth illustrative methods which explain the operation of the functionality of Section A. Section C describes illustrative computing functionality that can be used to implement any aspect of the features described in Sections A and B.

Figure 14:
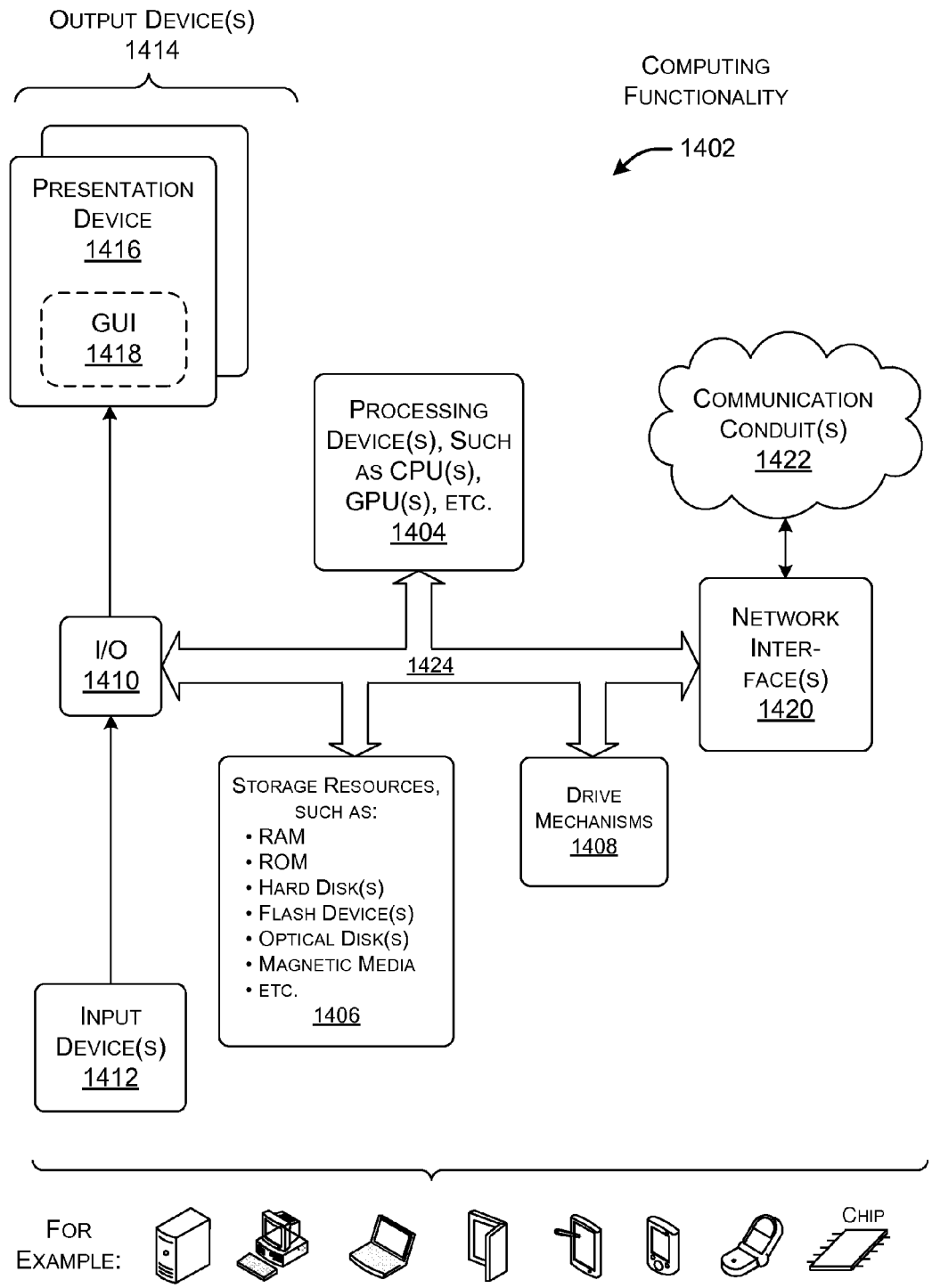
FIG. 14 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 14, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Finally, the terms "exemplary" or "illustrative" refer to one implementation among potentially many implementations.

A. Illustrative Context-Based Search Mechanisms

A.1. Overview

Figure 1:
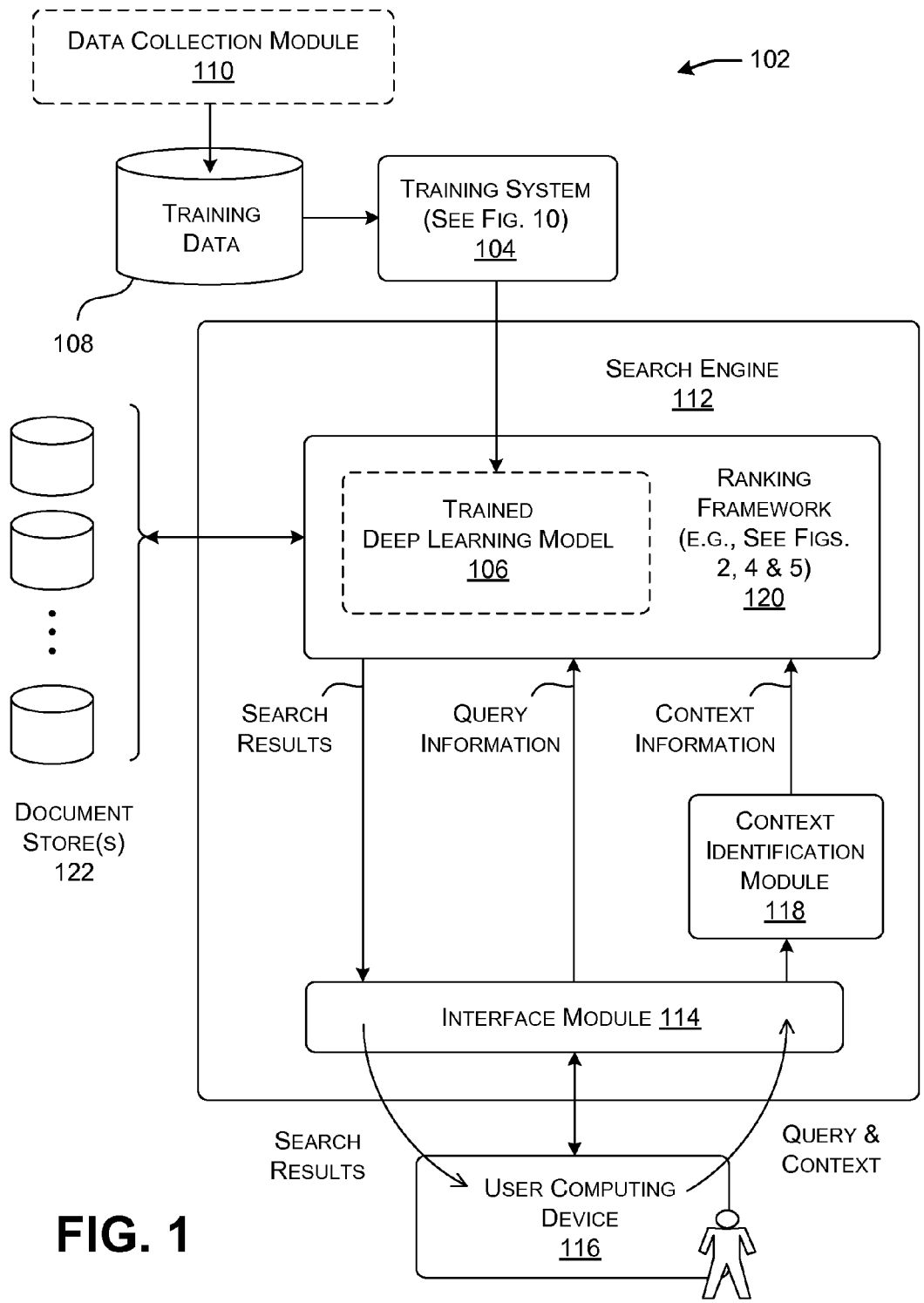
FIG. 1 shows an illustrative environment in which a search engine processes queries submitted by users, in conjunction with context information associated with the queries.

FIG. 1 shows an environment 102 that includes a training system 104 for producing a deep learning model 106. A deep learning model 106 (henceforth, simply "model") refers to any model that expresses the underlying semantic content of an input linguistic item. In one implementation, the model 106 may correspond to a multilayered neural network, also referred to as a deep neural network (DNN). Subsection A.2 (below) provides further details regarding one implementation of the model 106. The training system 104 produces the model 106 based on training data maintained in a data store 108. (In all cases herein, the term "data store" may correspond to one or more underlying physical storage mechanisms, provided at a single site or distributed over plural sites.) A data collection module 110 provides the training data based on any data collection technique. Subsection A.3 (below) provides further details regarding one implementation of the training system 104.

A search engine 112 may use the model 106, among other components of a ranking framework (described below), to select and rank documents based on an input query, in conjunction with a context which describes the circumstance in which the query was submitted. In one case, a local computing device uses the search engine 112 to retrieve documents from a local (and/or remote) repository of documents; in that scenario, the search engine 112 may be more aptly referred to as a retrieval engine. In another case, a remote processing system uses the search engine 112 to retrieve documents from a remote repository of documents. A user may interact with the remote processing system via a local computing device. In other cases, the functionality associated with the search engine 112 may be distributed between each local computing device and the remote processing system. Further details regarding one implementation of the search engine 112 will be described below, in the context of the explanation of FIG. 6.

As the term is used herein, a query refers to any information specified by a user with the intent of retrieving one or more documents. A query conveys query information. The query information, for example, may correspond to the terms specified by the user, which make up the query.

A document refers to any content-bearing item against which the query is compared. In one case, a document corresponds to a discrete text-bearing content item produced by any document-creation tool, corresponding to any topic(s), and expressed in any format(s). For example, the document may correspond to a text document produced by a word processing program, an Email message produced by an Email program, an image having textual tags or annotations, a web page or other Internet-accessible content item, and so on. In another case, a document may correspond to any record in any type of data structure, or in any unstructured repository of records. For example, a document may correspond to an entry within a table, a node associated with a knowledge graph, and so on. For instance, in one case, a document may pertain to a person identified by an enterprise graph; that person, in turn, may be associated with text-bearing content, such as content (e.g., an Email message, etc.) authored by and/or consumed by the person. The search engine 112 can optionally rely on an indexing mechanism (not shown) to retrieve documents, given specified search terms.

In one particular case, a document specifically pertains to an entity. Such a document may be referred to as an entity document. A particular entity, in turn, pertains to any focus of interest, such as person, place, location, product, and so on. An entity document may include various entity components which describe different characteristics of the entity to which it pertains. For example, the entity components may describe the title of the entity, the attribute values associated with the entity, other documents associated with the entity document, the queries that users have submitted to access the entity document, and so on.

A context describes a circumstance in which a user has submitted a query, as expressed by context information. For example, in one case, a user may input a query by selecting one or more search terms which appear within some source document, such as a web page, an Email, etc. That is, the selected terms constitute the query. The context information for that query may correspond to words that occur in proximity to the query within the source document. More specifically, the context information for the query may correspond to the n words that occur prior to the query in the source document, and the m words that occur after the query in the source document (where n=m in some cases, and n≠m in other cases).

Alternatively, or in addition, the context information may describe any demographic characteristic of the user who has submitted the query. For example, the context information may describe the age, gender, educational level, profession, interests, etc. of the user. Alternatively, or in addition, the context information may describe the prior behavior of the user. For example, the context information may correspond to previous queries submitted by a user within some window of time, and/or over some number of previous user sessions, etc. The context information may also describe the selections (e.g., clicks) made by the user within some window of time and/or over some number of previous user sessions. As used herein, a "click" describes any manner by which a user may express interest in a document. For example, in some cases, a user may select a document in a search results page by explicitly clicking on it using a mouse device or the like, or touching it on a touch sensitive user interface presentation, etc. In other cases, a user may select a document by hovering over it using any input device. In other cases, a user may select document by performing some transaction that pertains to the document, such as by filling out a survey, purchasing a corresponding product, and so on. A session refers to a user's interaction with any user computing device, and/or any program (such as a browser program), demarcated by login/logoff events, time, and/or any other factors.

Alternatively, or in addition, the context information may describe the social contacts associated with the user. The search engine 112 may extract that information from any source, such as contact information maintained by the user using a social network service, etc.

Alternatively, or in addition, the context information may describe the location at which a user has submitted a query. The search engine 112 may determine the location of the user based on any position-determination mechanisms, such as satellite-based mechanisms (e.g., GPS mechanisms), triangulation mechanisms, dead-reckoning mechanisms, and so on. Alternatively, or in addition, the context information may describe the time at which a user has submitted a query.

The context information may describe yet other circumstances pertaining to the submission of the query. The above examples of context information are cited by way of example, not limitation. In connection therewith, the search engine 112 can apply appropriate safeguards to ensure that any personal data associated with the user is handled in an appropriate manner, as set forth in Section C.

The more general term "linguistic item" corresponds to any information-bearing item expressed in any natural language and/or other symbolic framework, composed of a sequence of one or more words and/or other symbols. For example, a linguistic item may correspond to a document, a query, a context, etc. A linguistic item may have two or more parts (or components) which convey different respective pieces of information. For example, a document may have a title part, keyword part, and a body part. A context may also have the various components set forth above.

As shown in FIG. 1, the search engine 112 may include a search engine interface module 114 for interacting with at least one user computing device 116. In one case, the search engine 112 is implemented by a separate computing device compared to the user computing device 116. In another case, the search engine 112 is implemented by the user computing device 116 itself.

A context identification module 118 extracts context information associated with the context in which the query was submitted. The context identification module 118 can perform this task in different ways for different respective types of context information. For example, in one case, the context identification module 118 can extract the words which precede and follow the query within a source document, within a specified context window. In another case, the context identification module 118 can receive location information from a position-determination mechanism, time information from a clock mechanism, and so on.

A ranking framework 120 receives query information associated with the query and context information associated with the query's context. Based on this information, the ranking framework leverages the model 106 to rank a plurality of documents, provided in a plurality of data stores 122. The ranking framework 120 then generates and delivers search results. The search results convey the outcome of the ranking performed by the ranking framework 120.

In one case, at least some of the data stores 122 may be provided at a remote location with respect to the user. For example, at least some of the data stores 122 may correspond to distributed storage resources accessible via a wide area network (e.g., the Internet). Alternatively, or in addition, at least some of the data stores 122 may correspond to storage resources provided by a cloud storage mechanism. Alternatively, or in addition, at least some of the data stores 122 may correspond to local storage resources provided by the user computing device 116.

Figure 2:
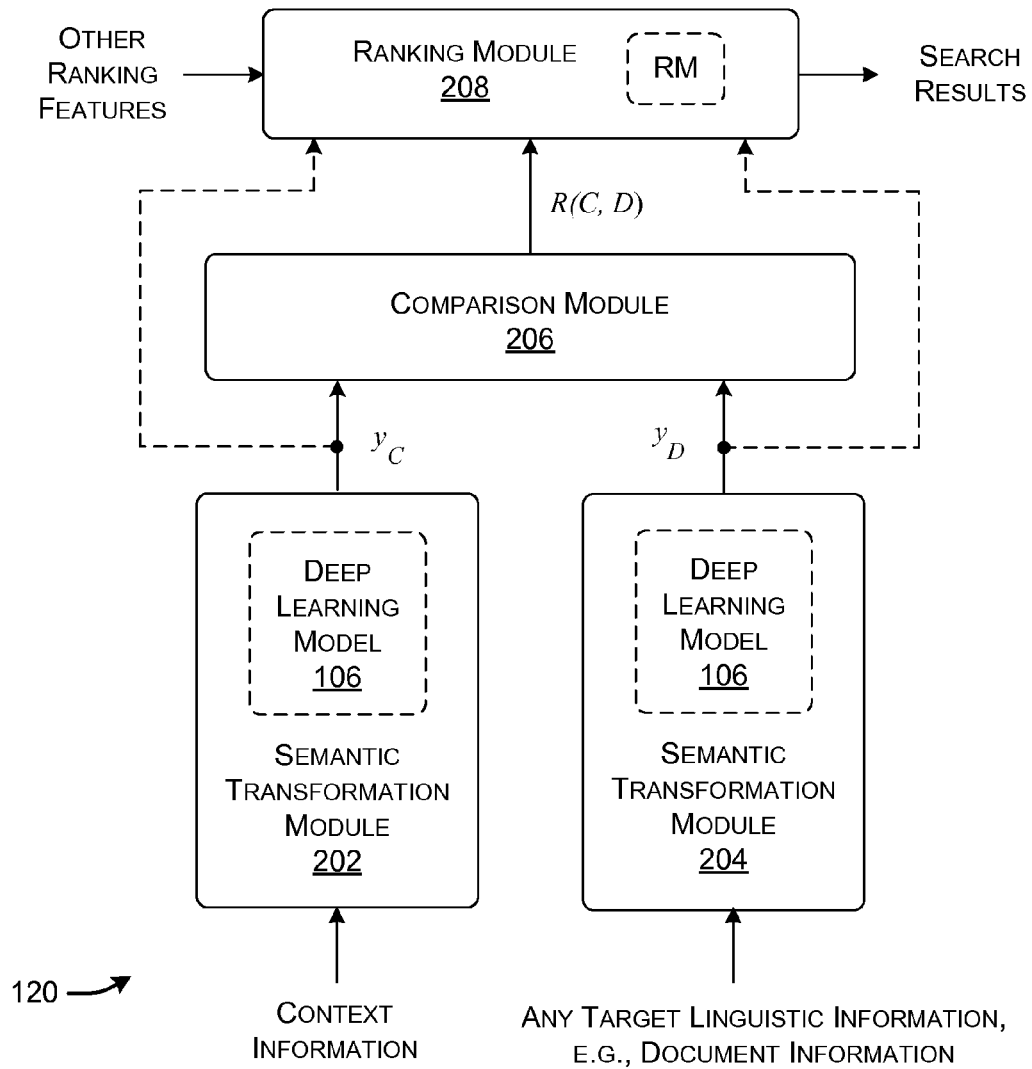
FIG. 2 shows an overview of one implementation of a ranking framework, which is a component of the search engine of FIG. 1.

FIG. 2 shows one implementation of at least part of the ranking framework 120 of FIG. 1. The ranking framework 120 is depicted as including two or more instances of a semantic transformation module ("transformation module" for brevity), e.g., a first transformation module 202 and a second transformation module 204, etc. Each transformation module uses an instantiation of the model 106 to map an input vector into an output concept vector. The input vector represents a particular linguistic item, such as a query, context, document, etc. The concept vector is expressed in a semantic space and reveals semantic information regarding the corresponding linguistic item from which it was derived. More generally, a "vector," as that term is used herein, broadly corresponds to any information having two or more elements, associated with respective vector dimensions.

In one case, the ranking framework 120 can actually provide two or more separate instances of transformation functionality to implement the plural transformation modules (202, 204) shown in FIG. 2. For example, the ranking framework 120 can provide two or more physical processing components associated with different instances of transformation functionality. Alternatively, or in addition, the ranking framework 120 can provide separate software-implemented instances of transformation functionality. Alternatively, or in addition, the ranking framework 120 can use a single instance of the transformation functionality to process separate input linguistic items in series, for example, by projecting a set of documents into the semantic domain, one after the other.

In the particular case of FIG. 2, the first transformation module 202 uses a first instance of the model 106 to project context information to a context concept vector $y_C$ in the semantic space. As stated above, the context information describes the context in which the user has submitted the query. More specifically stated, the first transformation module 202 can process a particular component of the context information, such as the window of text surrounding the query in a source document. The context concept vector $y_C$ in this example conveys the meaning of the words in that window of text, and thus could be more specifically denoted as $y_{C_{WINDOW}}$. Other transformation modules (not shown) can process other components of the context information. For example, another transformation module (not shown) can produce a context concept vector $y_{C_{HISTORY}}$ based on previous queries submitted by a user. Another transformation module can produce a context concept vector $y_{C_{TOPICS}}$ based on the interests of the user, and so on. Alternatively, or in addition, the ranking framework 120 can produce a context-related input vector by concatenating two or more separate instances of input information, corresponding, respectively, to separate components of context information. For example, the ranking framework 120 can append text in a window surrounding the user's query to text associated with the user's last v queries, etc. That aggregate result can then be used to produce a single input vector which is fed to the first transformation module 202, to produce a single context concept vector $y_{C_{COMBINED}}$. To facilitate explanation, however, the context concept vector will be henceforth referred to in a generic way as simply $y_C$, which may correspond to a context concept vector produced in any of the ways described above.

The second transformation module 204 operates on whatever candidate item that is being compared against the query. For example, the second transformation module 204 may use a second instance of the model 106 to project document information to a document concept vector $y_D$. The document information describes the text content of a particular document. The document concept vector $y_D$, in turn, conveys the meaning of the document in the same semantic space as the context concept vector $y_C$.

Like the context, a document may include different parts, such as the title of the document, the body of the document, the keywords associated with the document, and so on. Although not explicitly shown in FIG. 2, different transformation modules can operate on different respective document parts to produce different document-related concept vectors. For example, the transformation module 204 can operate on just the title of a document to produce a document title concept vector $y_{D_{TITLE}}$. Another transformation module (not shown) can operate on the body of the document to produce a body concept vector $y_{D_{BODY}}$, and so on. Alternatively, or in addition, the ranking framework 120 can produce an aggregate document-related input vector by concatenating two or more parts of a single document. For instance, the ranking framework 120 can append the title of the document to the keywords associated with the document to produce a single input vector, which may then be processed by the transformation module 204 to produce a single document concept vector $y_{D_{COMBINED}}$, etc. To facilitate explanation, however, the document concept vector will be referred to in a generic way as simply $y_D$, which may correspond to a document concept vector produced in any of the ways described above.

Although not explicitly shown in FIG. 2, the ranking framework 120 can use a plurality of other transformation modules to process other instances of document information, corresponding to other respective documents. As a result, the ranking framework 120 can produce at least one context concept vector $y_C$ associated with the context information, and a plurality of document concept vectors associated with plural candidate documents under consideration.

A comparison module 206 can compare each context concept vector $y_C$ with each document concept vector $y_D$, to produce a relevance measure. The relevance measure provides an indication of the extent of a semantic relationship between the two concept vectors. Relevance may be defined in any environment-specific manner; in one case, for instance, the relevance measure describes how close the context concept vector $y_C$ is to the document concept vector $y_D$ within the semantic space. In other words, in one case, the relevance measure indicates the degree of conceptual relatedness of the context of the query (associated with the context information) to the document under consideration (associated with the document information). Two vectors that are close together in the semantic space pertain to the same or related concepts. Two vectors that are far apart in the semantic space refer to dissimilar concepts.

A ranking module 208 may generate ranking scores for the documents which express the relevance of the documents, with respect to the user's query and the context associated with the user's query. The ranking module 208 may then rank the documents, based on the ranking scores, e.g., from most relevant to least relevant, or vice versa. The ranking module 208 performs its ranking operation based on a collection of features. The features may include, in part, the relevance measures generated by the comparison module 206. Alternatively, or in addition, the features may include the original concept vectors generated by the transformation modules (202, 204, . . . ); FIG. 2 illustrates the optional use of the concept vectors as features by dashed lines that point from the transformation modules (202, 204, . . . ) to the ranking module 208. The features can also include convey other aspects of the user's search that do not pertain to the semantic analysis performed by the transformation modules (202, 204, . . . ). For example, the ranking module 208 can also performing ranking based on the popularity of terms that are expressed in the query and/or document under consideration, etc.

In one case, the ranking module 208 may perform its ranking operation based on a ranking model (RM). An offline process may produce the ranking model (RM) in any manner, e.g., based on any machine learning technique.

Figure 3:
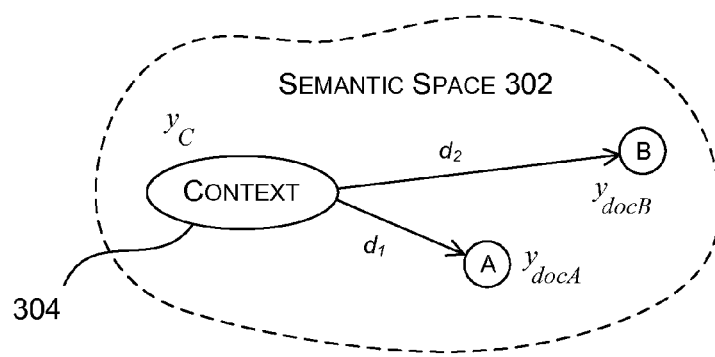
FIG. 3 depicts concept vectors within a high-level semantic space.

FIG. 3 is a high-level depiction of a portion of a semantic space 302, having any number of dimensions. The space 302 shows a context concept vector $y_C$ 304 and at least two document concept vectors ($y_{docA}$ and $y_{docB}$), corresponding to two respective documents under consideration (documents A and B). The context concept vector $y_C$ 304 is closer to the document concept vector $y_{docA}$, compared to the document concept vector $y_{docB}$. Based on this insight, the ranking module 208 may conclude that the document A is more relevant to the context, associated with the circumstance in which the user has submitted his or her query, compared to document B.

Consider a concrete example to further illustrate the example of FIG. 3. Assume that the user has selected the query "Michael Jordon" in the context of reading document that describes a particular building under construction. The text surrounding that query likely pertains to the topic of architecture. For example, the text may include words such as "blueprint," "square footage," "roofline," and so on. Assume that a first candidate document pertains to the architect Michael Jordon, while a second candidate document describes the basketball player Michael Jordon. The context concept vector $y_C$ can be expected to lie closer to the first document concept vector $y_{docA}$, compared to the second document concept vector $y_{docB}$. The ranking module 208 may leverage this finding to demote the relevance of the second document and to promote the relevance of the first document. In contrast, a popularity-based feature will vote in favor of selecting the second document over the first document. The training process can attach an environment-specific weight to each ranking feature to establish the extent to which that feature influences the overall ranking score for a candidate document under consideration.

In another example, the user who is performing the search may himself or herself be an architect, as reflected by information provided by the user on a social network site, a professional website, etc. The ranking framework 120 can leverage the above knowledge to promote the first document (which pertains to the architect "Michael Jordon") over the second document (which pertains to the basketball player of the same name). In yet another case, the user may have performed several recent searches pertaining to the topic of architecture. Again, the ranking framework 120 can apply the above knowledge to favor documents which pertain to the hypothetical architect "Michael Jordon."

More specifically, a particular context may have g different parts or components (e.g., nearby text, query history, location, time, etc.). Likewise, a particular candidate document under consideration may have h different parts or components (title, keywords, body, etc.). The ranking framework 120 can produce a concept vector for each dimension of the context information and each dimension of the document information. The comparison module 206 can then produce a relevance measure that reflects a comparison of any component of context information with any component of document information; in total, the comparison module 206 can generate g×h such relevance measures. The ranking module 208 can use any or all of the g×h relevance measures as ranking features to assess the suitability of a candidate document with respect to a particular context (and query). With respect to the entire set of documents D under consideration, the ranking module 208 may perform analysis based on a consideration of D×g×h relevance measures, among other features.

Figure 4:
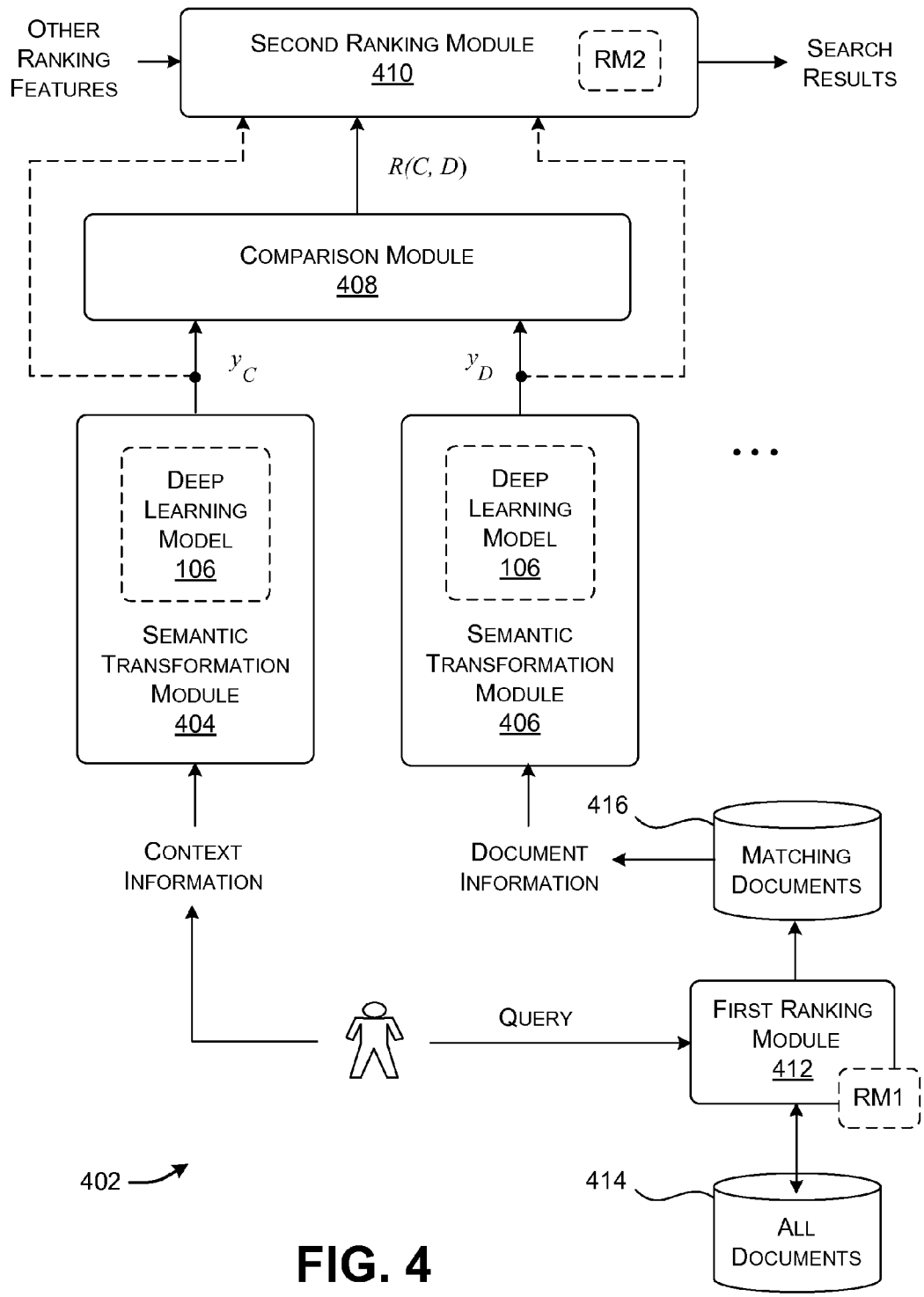
FIG. 4 shows one implementation of the ranking framework introduced in FIG. 2.

Different ranking architectures can leverage the approach shown in FIG. 3. For example, FIG. 4 shows an implementation 402 of the ranking framework 120 that includes a first transformation module 404, a second transformation module 406, a comparison module 408, and a ranking module 410 (referred to as a "second ranking module" for reasons that will be made clear below). These modules (404, 406, 408, 410) perform the same functions as the same-named modules (202, 204, 206, 208) described with respect to FIG. 2. FIG. 4 supplements FIG. 2 by explaining one technique for deriving the document information which is provided as input to the second transformation module 406.

More specifically, a first ranking module 412 receives the user's query. The first ranking module 412 then assigns ranking scores to a plurality of documents in a first data store 414, reflecting the relevance of the documents with respect to the query. Based on those ranking scores, the first ranking module 412 then ranks the documents in order of relevance, and selects a set of k most relevant documents. The first ranking module 412 may store the set of k documents a second data store 416, or references to the set of k documents.

The implementation 402 then proceeds to compare the context information with each instance of document information, associated with each document identified in the second data store 416. The implementation 402 can perform this task by serially feeding different instances of document information to the second transformation module 406, or by processing plural instances of document information using plural parallel transformation modules (not shown).

In performing the above-described functions, the first ranking module 412 can apply any type of ranking model (RM1). In one implementation, that ranking model does not take into consideration the context in which the user has submitted the query. Rather, the implementation 402 relies on the second ranking module 410 to re-rank the documents in the set of k documents based on the relevance measures provided by the comparison module 408. The dashed lines leading into the ranking module 412 indicate that the ranking module 412 can, in addition, or alternatively, perform its ranking based on the context concept vectors and/or the document concept vectors fed to it by the transformation modules (404, 406).

In one variation of the implementation 402 of FIG. 2, the documents stored in the first data store 414 correspond to entity documents. Each entity document pertains to a particular entity, such as a person, product, location, etc. And as described above, each entity document may have different components which describe the entity. For example, an entity that pertains to a particular movie may have attribute values that describe the title of the movie, the genre of the movie, the popularity of the movie, the sites where the movie is mentioned, the actors which appear in the movie, the director of the movie, and so on.

In that variation, the set of k documents in the data store 416 correspond to the set of k entities which match the user's query, without taking into consideration the context information. The implementation 402 can use the transformation module 406 to project any component of the entity documents into the semantic space, such as by forming input vectors that describe the titles associated with the entities, etc. The final output of the second ranking module 410 corresponds to a re-ranked set of entities that now take the context information into consideration.

Figure 5:
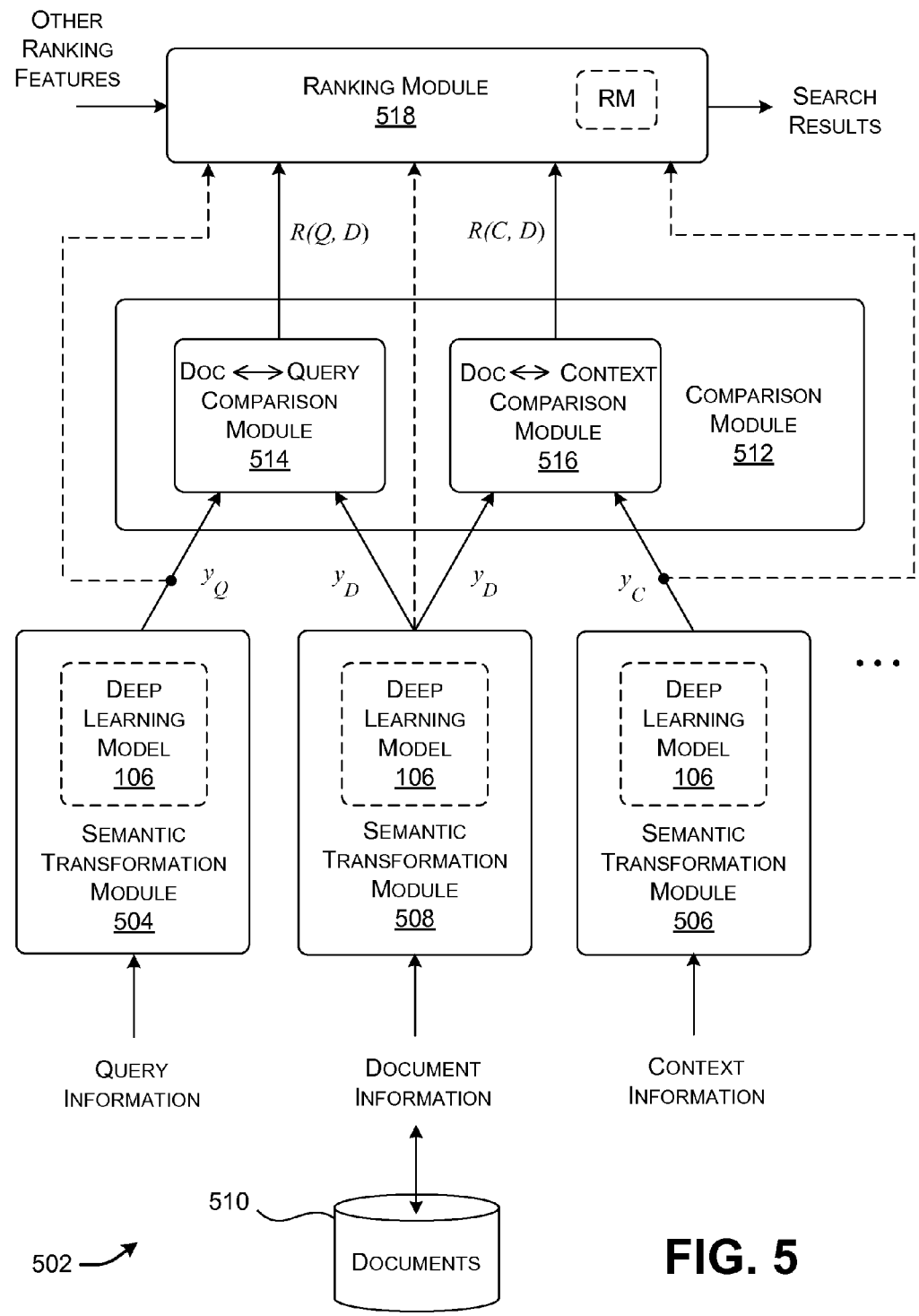
FIG. 5 shows another implementation of the ranking framework of FIG. 2.

FIG. 5 shows another implementation 502 of the ranking framework 120. Here, a first transformation module 504 receives query information associated with the query inputted by the user. The first transformation module 504 uses a first instance of the model 106 to project the query information into a query concept vector $y_Q$ in a semantic space. A second transformation module 506 receives context information associated with the context in which the user has submitted the query. The second transformation module 506 uses a second instance of the model 106 to transform the context information into a context query vector $y_C$. A third transformation module 508 receives document information which describes a candidate document, among a collection of such documents to be considered, stored in a data store 510. The third transformation module 508 uses a third instance of the model 106 to transform the document information into a document concept vector, $y_D$.

A comparison module 512 can forming a plurality of relevance measures, for each document, based on the above-described concept vectors. For example, a first comparison module 514 can generate a relevance measure which reflects the conceptual relevance of the query concept vector $y_Q$ to the document concept vector $y_D$. A second comparison module 516 can generate a relevance measure which reflects the conceptual relevance of the document concept vector $y_D$ to the context concept vector $y_C$. Although not shown in FIG. 5, alternatively, or in addition, a comparison module can also form a relevance measure based on any joint analysis of all three concept vectors, $y_Q$, $y_D$, and $y_C$. A ranking module 518 can then rank the plurality of candidate documents based on a plurality of features, including the relevance measures, for each document, fed to it by the comparison module 512. The dashed lines leading into the ranking module 518 indicate that the ranking module 518 can, in addition, or alternatively, perform its ranking based on the original concept vectors, e.g., $y_Q$, $y_C$, and $y_D$.

In summary, the ranking framework 120 of FIG. 2 can be applied to any type of linguistic items, any components of those linguistic items, and to any ranking architecture. For example, some multi-level or cascading ranking architectures may use the deep learning model 106 at any level of the ranking operation, such as a secondary stage (e.g., as exemplified in FIG. 4). Other ranking architectures may apply the deep learning model 106 in a single inclusive ranking operation (e.g., as exemplified in FIG. 5). Still other ranking architectures can apply the deep learning model 106 at multiple locations/stages within the ranking architectures. Further, the term ranking, as broadly used herein, encompasses a filtering operation. In a filtering operation, a ranking architecture may use the deep learning model 106 to eliminate candidate documents from further consideration.

Figure 6:
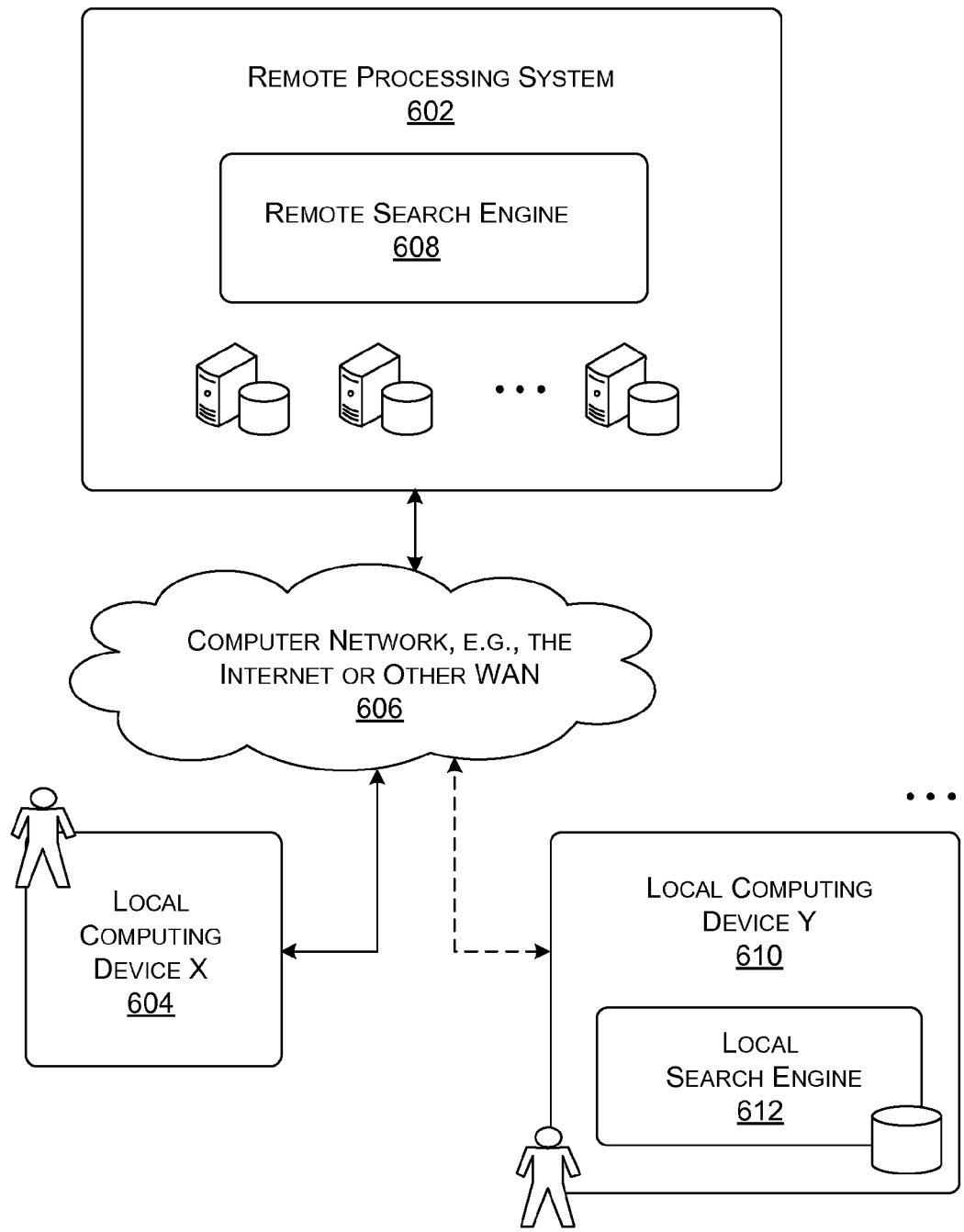
FIG. 6 shows one implementation of the environment of FIG. 1.

FIG. 6 shows one implementation of the environment 102 of FIG. 1. The environment may include a remote processing system 602 coupled to a local user computing device 604 via a computer network 606. In this implementation, the remote processing system 602 includes a remote search engine 608 which implements all aspects of the search engine 112 described in FIG. 1. A user may interact with the remote search engine 608 via the local computing device 604, e.g., by interacting with a search interface page hosted by the remote search engine 608.

In another case, a user may interact with another user computing device 610 which hosts a local search engine 612; in that case, the search engine 612 may alternatively be referred to as a retrieval engine. In another case, aspects of the search engine 112 of FIG. 1 may be distributed between a local user computing device and the remote processing system 602 in any manner.

Any local computing device may correspond to, for example: a personal desktop computing device, a laptop computing device, a game console device, a set-top box device, a tablet-type computing device, a smartphone, a portable music-playing device, and electronic book reader device, a wearable computing device, and so on. The remote processing system 608 can be implemented as one or more server computing devices in conjunction with one or more data stores. The computer network 606 may correspond to a wide area network (e.g., the Internet), a local area network, one or more point-to-point links, and so on, or any combination thereof.

A.2. The Semantic Transformation Module

Figure 7:
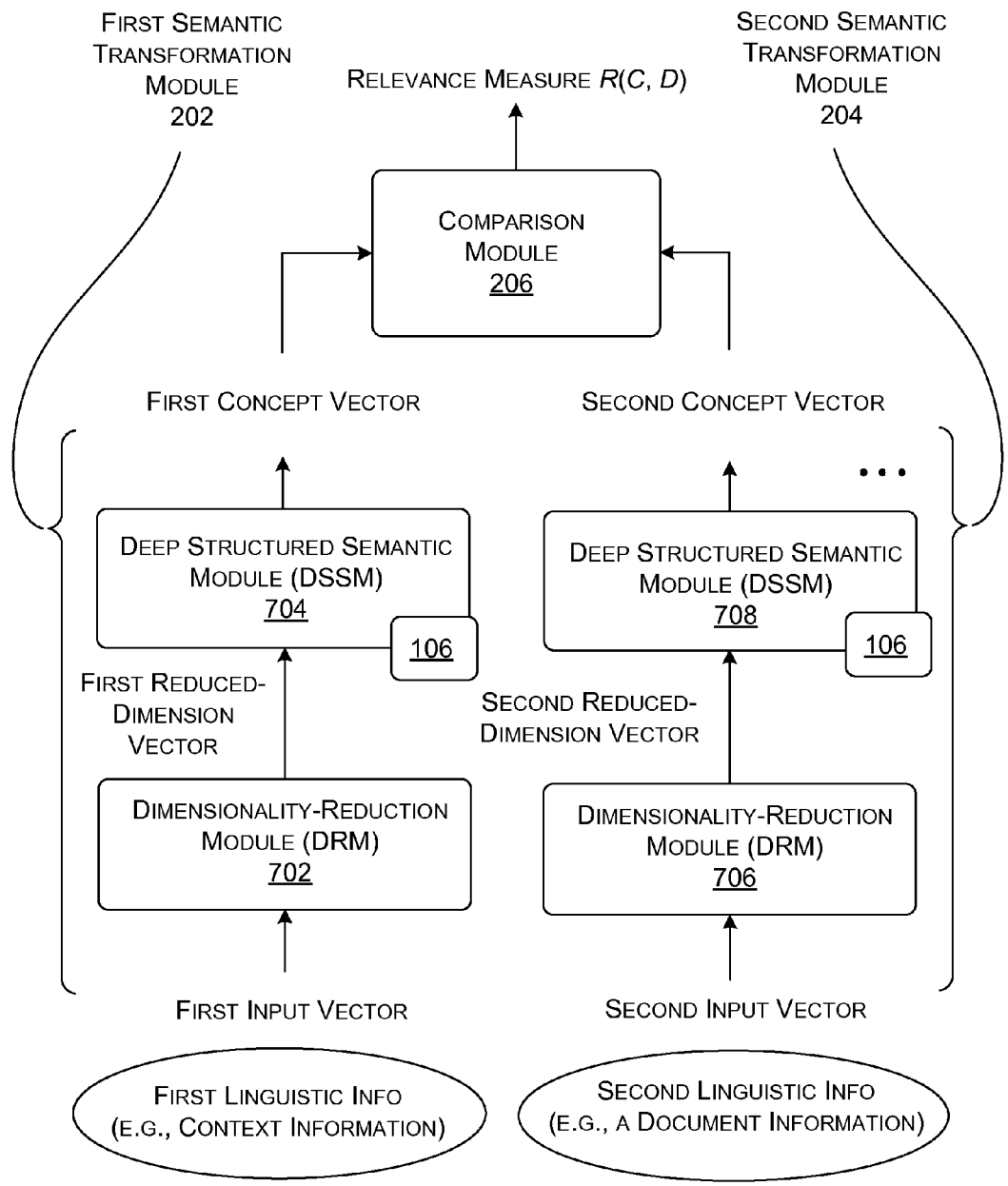
FIG. 7 shows further details regarding the ranking framework of FIG. 2.

FIG. 7 shows additional details regarding the ranking framework 120 shown in FIG. 2. To revisit that earlier explanation, the ranking framework 120 can include two transformation modules (202, 204), the first for transforming context information into a context concept vector $y_C$, and the second for transforming document information into a document concept vector $y_D$. A comparison module 206 compares the context concept vector $y_C$ with the document concept vector $y_D$ to produce a relevance measure The first transformation module 202 includes a dimensionality-reduction module (DRM) 702 and a deep structured semantic module (DSSM) 704. Similarly, the second transformation module 204 includes a DRM 706 and a DSSM 708. The DSSMs perform their functions based on respective instances of the deep learning model 106.

Each DRM receives an input vector which represents a linguistic item. For example, the DRM 702 receives an input vector which represents the context information, while the DRM 706 receives an input vector that describes the document information, corresponding to a particular document. The first DRM 702 produces a first reduced-dimension vector, while the second DRM 706 produces a second reduced-dimension vector. A reduced-dimension vector has a reduced dimensionality with respect to its corresponding input vector, while still representing the same information expressed in the input vector.

Consider the operation of the DRM 702; other DRMs operate in the same manner. In one implementation, the DRM 702 reduces the dimensionality of its input vector using an n-gram hashing technique. For example, assume that the context corresponds to the phrase "automotive body shop," which may correspond, in turn, to a phrase in proximity to an input query. The ranking framework 120 may initially represent this phase as an input vector having a number of dimensions (entries) equal to all the possible words that can be expressed in a natural language, including the words "automotive," "body," and "shop." The ranking framework 120 can set a value of 1 for the entries "automotive," "body," and "shop" in the input vector, and a value of 0 for all other entries in the vector. If a word appears multiple times in the input phrase, then the entry for that word will reflect the number of times that the word appears. In other words, the input vector described above provides a bag-of-words representation of the input phrase; further, the input vector is very sparsely populated.

The DRM 702 reduces the dimensionality of an input vector by first appending dummy tokens (e.g., the token "#") to the beginning and end of the input phrase under consideration, e.g., to produce "#automotivebodyshop#". The DRM 702 can then run an n-letter window over the input phrase to produce a series of n-grams. For example, if n=3, the DRM 702 produces the following sequence of trigrams, "#au", "aut", "uto", "tom", "omo", and so on, until the terminal dummy character is reached. The DRM 702 can then form a reduced-dimension vector having a number of dimensions corresponding to all the possible trigrams in particular language (with the possible exclusion of some uninteresting trigrams). In that vector, the DRM 702 can set the value of 1 for the trigrams entries that appear in the input phrase, e.g., by setting a 1 value for "#au", a 1 value for "aut," and so on, and a value of 0 for other entries. If a phrase includes multiple occurrences of the same trigram, then the corresponding entry in the reduced-dimension vector will indicate that number of occurrences of the trigram. Overall, there are many less unique trigrams than unique words in a language, so the reduced-dimension vector will have a much smaller dimensionality compared to the input vector.

In another implementation, the DRM 702 can first convert an input phrase into its phonetic representation (e.g., by expressing "cat" as "kat"), and then perform the above-described operations on the phonetic representation of the input phrase. For example, the DRM 702 can run an n-letter window over the phonetic version of the input phrase, and then form a reduced-dimension vector based on the trigrams which appear in the phonetic representation of the phrase.

Generally, it may be desirable to reduce the dimensionality of the input vectors for the purpose of performing training of the model 106 (in an offline phase of operation) in a more time-efficient and resource-efficient manner. The real-time operation of the ranking framework 120 can also operate more efficiently by using reduced-dimension vectors. In other cases, the ranking framework 120 can use other techniques to reduce the dimensionality of the input vectors (besides the above n-gram hashing technique), such as a random projection technique. In another case, the ranking framework 120 can entirely omit the use of DRMs, meaning that it operates on the original uncompressed input vectors.

Each DSSM projects an input reduced-dimension vector into a concept vector, using the model 106. More specifically, advancing to FIG. 8, this figure shows one implementation of the DSSM 704 of FIG. 7. The DSSM 708 of the second transformation module 204 has a similar construction and manner of operation, but is omitted from FIG. 8 to facilitate explanation.

Figure 8:
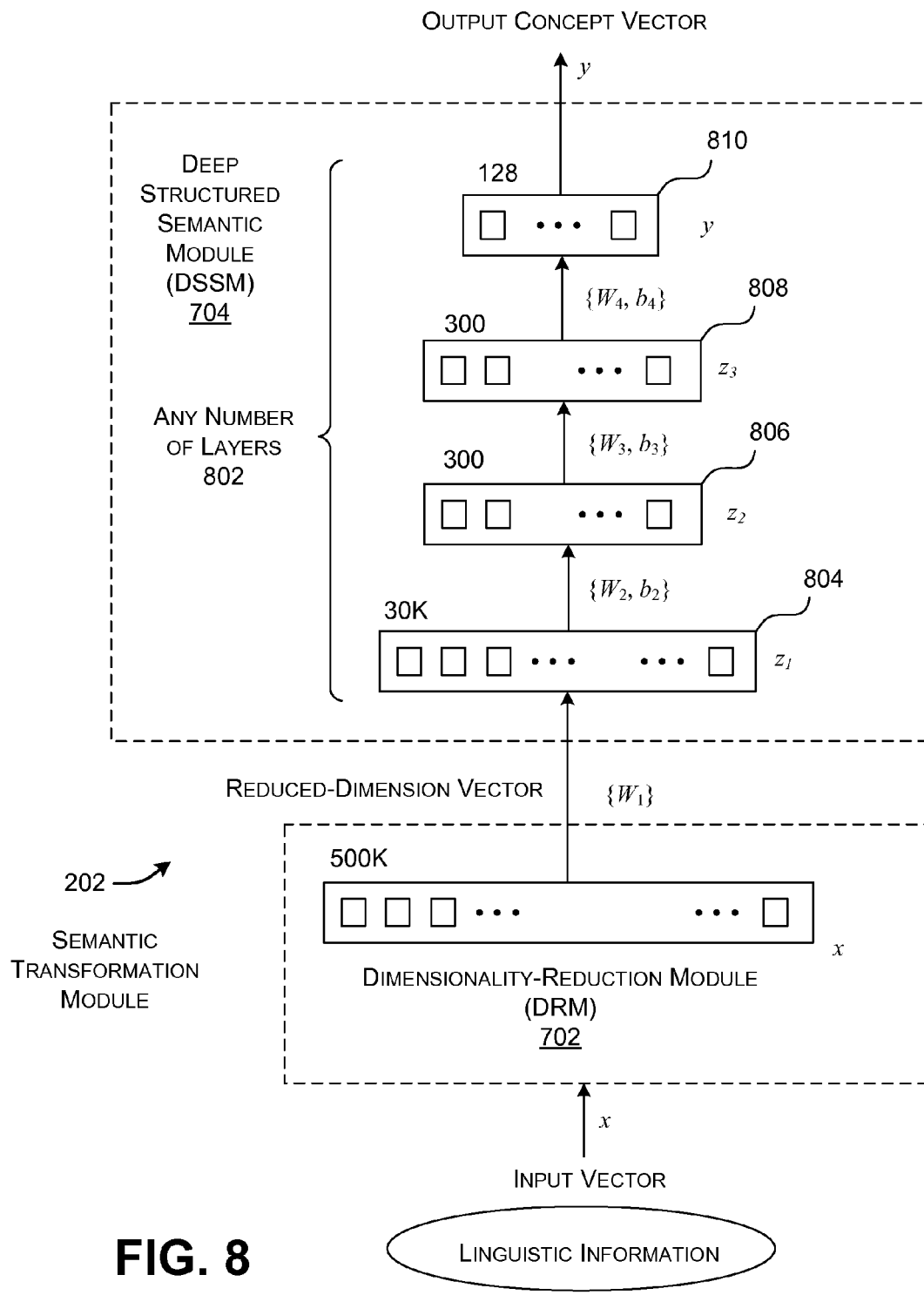
FIG. 8 shows one implementation of a semantic transformation module, which is a component of the ranking framework of FIG. 7.

The DSSM 704 may be implemented as a deep neural network (DNN), composed of a plurality of layers 802. FIG. 8 specifically shows that the DSSM 704 includes four layers, but, more generally, the DSSM 704 can include any number of layers. Each layer, in turn, includes a plural of elements, referred to as neurons. Each neuron stores a value. Each neuron, in a given layer, is furthermore connected to zero, one or more neurons in an immediately anterior layer (if any), and zero, one or more neurons in an immediately posterior layer (if any). Here, "anterior" and "posterior" refer to adjacent layers in relation to a direction of information flow through the DNN, which is from bottom to top in FIG. 8. That is, with respect to a given layer, anterior layers represent lower layers, while posterior layers represent higher layers.

The layers 802 include a bottommost layer 804 for storing values, collectively denoted by the vector $z_1$. More specifically, the layer 804 represents the input to the DSSM 704, and therefore stores the values associated with the reduced-dimension vector provided by the DRM 702. A next layer 806 stores a vector $z_2$ having values that are derived from the values in the first layer, associated with the vector $z_1$. A next layer 808 stores a vector $z_3$ having values that are derived from the values in the layer 806, associated with the vector $z_2$. A final output layer 810 stores the concept vector y, having values that are derived from the values in the layer 808, associated with the vector $z_3$.

FIG. 8 also represents the various layers (804, 806, 808, 810) as boxes having different respective lengths to indicate that the different layers have different respective dimensionalities. Without limitation, in one implementation, the input vector x fed to the DRM 702 has a dimensionality of 500K, indicating that there are 500K possible words in an identified vocabulary. The layer 804 has a dimensionality of 30K. For instance, if a trigram hashing technique is used to produce the reduced-dimension vector, then the dimensionality of layer 804 means that there are 30K unique trigrams within the original corpus of 500K words (with the possible exclusion of some uninteresting trigrams). The layer 806 and the layer 808 each have a dimensionality of 300 elements. And the layer 810 has a dimensionality of 128 elements. To repeat, however, another implementation of the DSSM 704 can employ any number of layers, each of which can have any size.

More formally stated, in one implementation, the vector $z_1$ in the layer 804 can be expressed as $z_1 = W_1 x$, where $W_1$ represents whatever transformation is used by the DRM 702 to produce the lower-dimension vector. The vector $z_i$ in layers 806 and 808 may be expressed as $z_i = f(W_i z_{i-1} + b_i)$, for i=2, ... N−1. And the vector y in the layer 810 may be expressed as $y = f(W_N z_{N-1} + b_N)$, where, in the specific example of FIG. 8, N=4. The symbol $W_i$ denotes the i-th weighting matrix produced by the training system 104 (of FIG. 1), and the symbol $b_i$ refers to an optional i-th bias term, also produced by the training system 104. The function $f(x)$, referred to as the activation function, can be formulated in different ways, such as the following tan h function:

$$f(x) = \frac{1 - e^{-2x}}{1 + e^{-2x}}. \quad (1)$$

Figure 9:
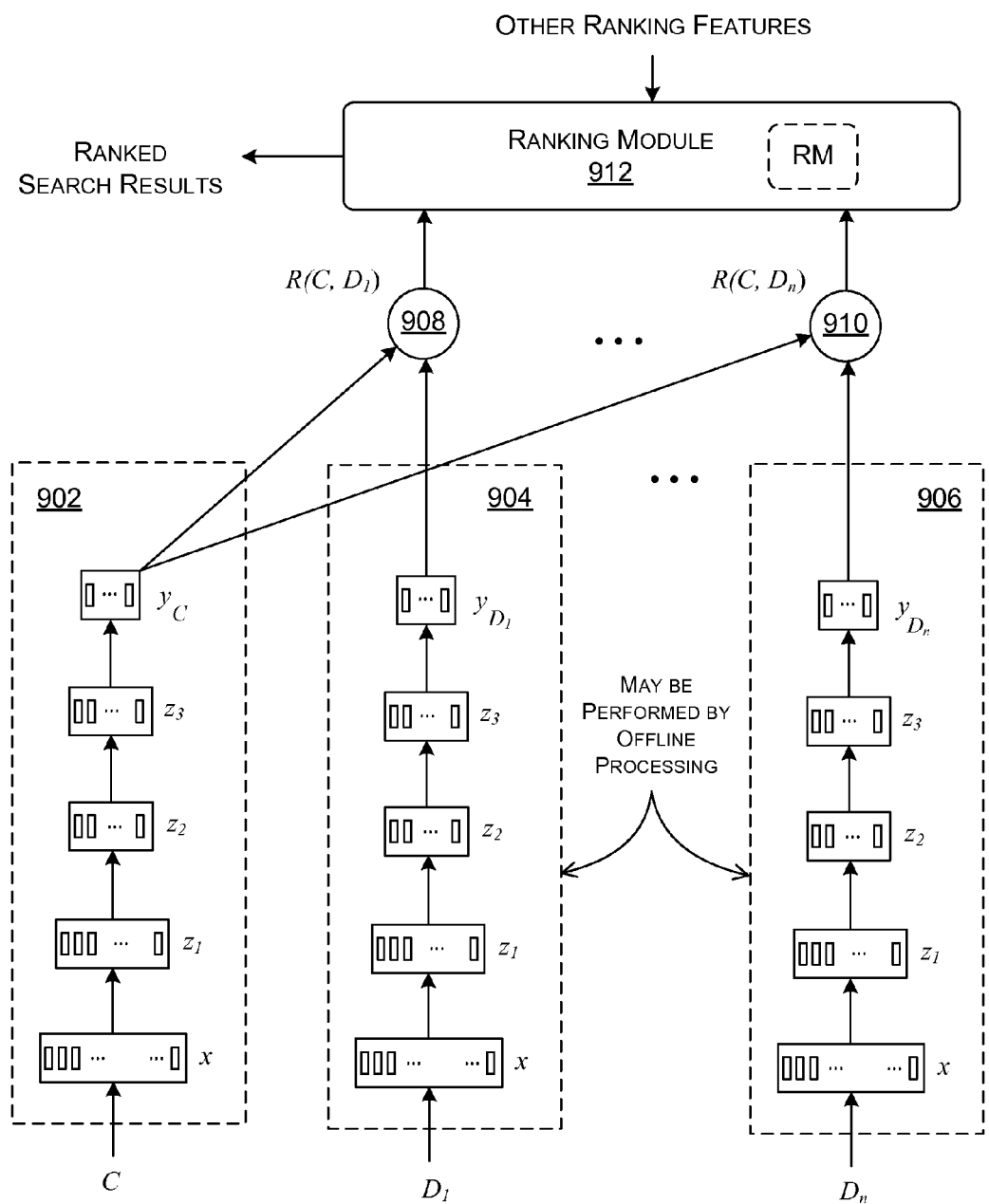
FIG. 9 shows another implementation of the ranking framework of FIG. 2, here leveraging the semantic transformation functionality of FIG. 8.

FIG. 9 shows an application of the ranking framework 120 of FIG. 8. As shown there, a first transformation module 902 produces a context concept vector $y_C$ which expresses a context (C) associated with a query (Q), in a semantic space. A second transformation module 904 produces an entity concept vector $y_{D_1}$ which represents a document ($D_1$) in the same semantic space. A third transformation module 906 produces an entity concept vector $y_{D_n}$ which represents a document ($D_n$) in the same semantic space, and so on.

More specifically, the three (or more) transformation modules (902, 904, . . . , 906) can be implemented by separate physical components or software instances. Or the three (or more) transformation modules (902, 904, . . . , 906) can be implemented by a single physical component or software instance, which processes linguistic items in series, one after the other. Further, any of the transformation modules (902, 904, . . . , 906) can optionally perform their processing operations on their input linguistic items (e.g., on the candidate documents $D_1, \ldots, D_n$) as an offline process, that is, in advance of the user submitting the query Q.

A first comparison module 908 determines the extent of a semantic relationship (e.g., similarity) between the context C and the document $D_1$ in the semantic space, while a second comparison module 910 determines the semantic relationship (e.g., similarity) between the context C and the entity document $D_n$ in the semantic space. In one implementation, each comparison module can compute the semantic relationship (e.g., similarity) between the context C and a document D as a cosine similarity measure, as follows:

$$R(C, D) = \text{cosine}(y_C, y_D) = \frac{y_C^T y_D}{\|y_C\| \|y_D\|}. \quad (2)$$

Other comparison techniques can be used instead of the cosine similarity determination technique, such as a Manhattan distance determination technique.

A ranking module 912 may receive the relevance measures produced by the comparison modules (908, . . . , 910). The ranking module 916 may then assign a ranking score to each candidate entity document based on the relevance measures, together with any other features.

A.3. The Training System

Figure 10:
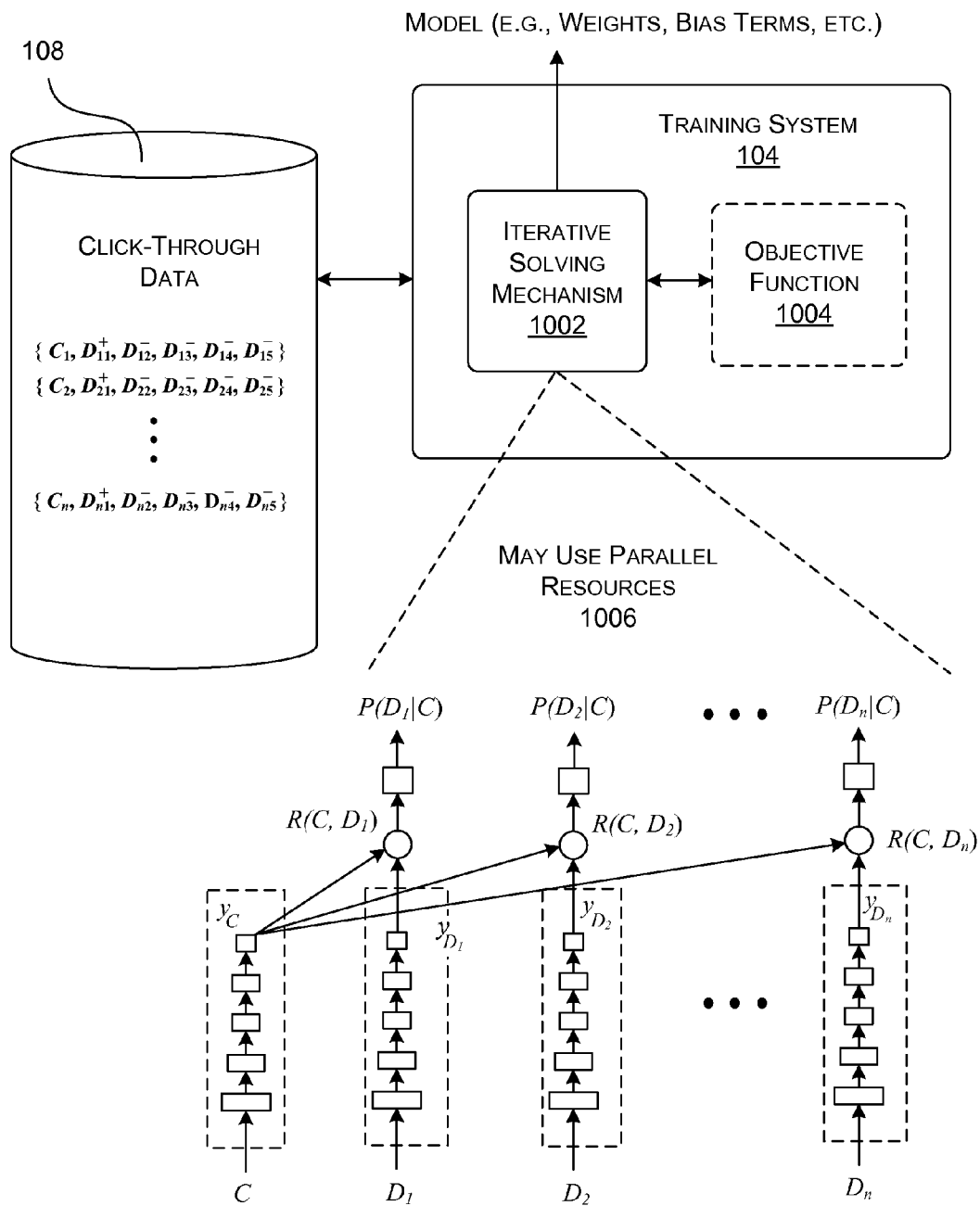
FIG. 10 shows one implementation of a training system, also shown in FIG. 1. The training system produces a model for use by the search engine.

FIG. 10 shows one implementation of the training system 104 of FIG. 1. In one illustrative and non-limiting case, the training system 104 processes a corpus of click-through data (provided in a data store 108), to generate the model 106. The model 106 represents the collection of weighting matrixes ($W_i$) and bias factors ($b_i$) shown in FIG. 8. Collectively, the parameter values associated with the model 106 are referred to using the symbol Λ.

The click-through data generally describes: (1) queries submitted by actual users over some span of time; (2) an indication of documents that the users clicked on and the documents that the users failed to click on after submitting those queries; and (3) information describing the contexts associated with the respective queries. Here, to repeat, the term "click" is intended to have broad connotation. It may describe the case in which a user literally clicks on an entry within search results, or some other presentation of options, using a mouse device. But the term click also encompasses the cases in which a user shows interest in a document in any other manner.

However formed, the click-through data encompasses a plurality of instances of training data, each constituting a training example. Each example includes a context (C) associated with a particular submitted query (Q), a document (D+) that the user selected in response to the query (and its associated context), and at least one document (D−) that the user did not select in response to the query (and its associated context). In one case, the data collection module 110 can mine this information from archives of a search engine. In that situation, a non-clicked document (D−) of a training instance may correspond to an actual document that was offered to a user in response to a query, but which the user declined to select. In other cases, the collection module can randomly select any document from a corpus of documents, so long as the user did not actually select that document in response to the query. But in this latter case, there is no requirement that this document D− was actually presented to the user. In any case, FIG. 10 shows that a training example includes four non-clicked documents $\{D_2^-, D_3^-, D_4^-, D_5^-\}$, but a training example can include any number of such documents. The documents may correspond to documents provided in a data store, records in any data structure (such as entity-related records, etc.), and so on.

The training system 104 operates by using an iterative solving mechanism 1002 to iteratively achieve an objective defined an objective function 1004, by iteratively changing the parameter values of the model Λ. When the iterative processing is finished, the final parameter values constitute the trained model Λ. The objective function 1004, in turn, mathematically expresses an aim which the model Λ seeks to achieve, when fully trained. In the present case, the objective function stipulates that the conditional likelihood of the clicked documents, given respective contexts (associated with queries), is to be maximized, and the conditional likelihood of non-clicked documents, given the contexts, is to be reduced. In other words, the objective function attempts to make the assessed relevance of clicked documents as high as possible, while simultaneously attempting to make the assessed relevance of non-clicked documents as low as possible.

To mathematically derive the objective function, first note that the probability P(D|C) of a clicked document (D+) in a training example, given a query context C, can first be expressed as a softmax function as follows:

$$P(D^+ \mid C) = \frac{\exp(\psi R_\Lambda(C, D^+))}{\sum_{D' \in D} \exp(\psi R_\Lambda(C, D'))}. \quad (3)$$

The term $R_\Lambda(C, D^+)$ represents the semantic relationship (e.g., similarity) between the query context C and the clicked document D+ in the semantic space, for a given current selection of parameters associated with a model Λ. The term D represents the set of five documents in the training instance, including D+ and the four non-clicked documents, although, as stated above, a training example can include any number of non-clicked documents. The term $R_\Lambda(C, D')$ represents the semantic relationship (e.g., similarity) between the query context C and one of the documents (D′) in the training example, in the semantic space. The symbol ψ represents an empirically-derived smoothing factor (e.g., which can be generated by analyzing a held-out dataset of training examples). For this individual training example, the objective function will express an attempt to make R(C, D+) as high as possible, and each R(C, D−) as low as possible, to overall make P(D+|C) as high as possible, and each P(D−|C) as low as possible.

Overall, when considering all of the training instances in the corpus of click-through data, the objective function involves attempting to maximize the conditional likelihood of the clicked documents given the corresponding queries, or equivalently, minimize the following loss equation:

$$L(\Lambda) = -\log \prod_{(C,D^+)} P(D^+ \mid C). \quad (4)$$

In other words, the objective is to derive a set of parameter values that minimizes the above equation, with respect to all of the examples in the empirical click-through data, or some subset thereof.

In one approach, the iterative solving mechanism 1002 uses a gradient-based numerical optimization algorithm to solve the above problem, such as a gradient descent technique. The iterative solving mechanism 1002, for instance, can apply the following update rule to perform the optimization:

$$\Lambda_t = \Lambda_{t-1} - \epsilon_t \frac{\partial L(\Lambda)}{\partial \Lambda}\bigg|_{\Lambda = \Lambda_{t-1}}. \quad (5)$$

Here, $\Lambda_t$ and $\Lambda_{t-1}$ are the models at the $t^{th}$ and $t-1^{th}$ iteration, respectively, and $\epsilon_t$ is a learning rate parameter. From a high-level perspective, the iterative solving mechanism 1002 makes a large change in the model Λ whenever the model Λ is changing by a relatively large amount from iteration to iteration, and makes a smaller change in the model Λ whenever the model Λ is changing by a slower amount.

More specifically, assume that there are M training examples in the click-through data. The $m^{th}$ training example is $(C_m, D_m^+)$, corresponding to a particular pairing of a query context $(C_m)$ and a document $(D_m^+)$ that has been clicked in response to the query and its context. The loss function for that individual training instance is:

$$L_r(\Lambda) = -\log P(D_m^+ \mid C_m) \quad (6).$$

The derivative of the loss function as a whole can therefore be expressed as:

$$\frac{\partial L(\Lambda)}{\partial \Lambda} = \sum_{m=1}^{M} \frac{\partial L_m(\Lambda)}{\partial \Lambda}. \quad (7)$$

The term $$\frac{\partial L_m(\Lambda)}{\partial \Lambda}$$

can be derived as follows. To simplify the notation, the subscript m will be omitted in the following. First, the loss function derived above can be expressed as follows:

$$L(\Lambda) = \log(1 + \Sigma_j \exp(-\psi \Delta_j)) \quad (8),$$

where $\Delta_j = R(C, D^+) - R(C, D_j^-)$. The gradient of the loss function with respect to the $N^{th}$ weight matrix $W_N$ is:

$$\frac{\partial L(\Lambda)}{\partial W_N} = \sum_j \alpha_j \frac{\partial \Delta_j}{\partial W_N}, \quad (9)$$

where:

$$\frac{\partial \Delta_j}{\partial W_N} = \frac{\partial R(C, D^+)}{\partial W_N} - \frac{\partial R(C, D_j^-)}{\partial W_N}, \quad (10)$$

and $$\alpha_j = \frac{-\psi \exp(-\psi \Delta_j)}{1 + \sum_{j'} \exp(-\psi \Delta_{j'})}. \quad (11)$$

Now, let $z_{i,C}$ and $Z_{i,D}$ refer to the activation in the hidden layer $i$ for a query context C and document D, respectively. And let $y_C$ and $y_D$ refer to the output activation for the output layer 810 for query context C and document D, respectively. Further, to simplify the following notation, let a, b, and c correspond to $y_C^T y_D$, $1/\|y_C\|$, and $1/\|y_D\|$, respectively. Finally, assume that the activation function used by the model corresponds to the tan h function described above in Equation (1). With those definitions, each term in the right-hand side of Equation (10) can be calculated for the pair (C, D) using the following formula:

$$\frac{\partial R(C, D)}{\partial W_N} = \frac{\partial}{\partial W_N} \frac{y_C^T y_D}{\|y_C\| \|y_D\|} = \delta_{y_C}^{(C,D)} z_{N-1,C}^T + \delta_{y_D}^{(C,D)} z_{N-1,D}^T, \quad (12)$$

where:

$$\delta_{y_C}^{(C,D)} = (1 - y_C) \circ (1 + y_C) \circ (bc y_D - acb^3 y_C) \quad (13)$$

and $$\delta_{y_D}^{(C,D)} = (1 - y_D) \circ (1 + y_D) \circ (bc y_C - acb^3 y_D). \quad (14)$$

In the above equations, the operation $\circ$ is an element-wise multiplication (i.e., a Hadamard product).

The values $\{\delta\}$ for each successive hidden layer, moving down through the DNN in the direction of FIG. 8, can be computed through back projection as follows:

$$\delta_{i,C}^{(C,D)} = (1 + z_{i,C}) \circ (1 - z_{i,C}) \circ W_i^T \delta_{i+1,C}^{(C,D)} \quad (15)$$

and $$\delta_{i,D}^{(C,D)} = (1 + z_{i,D}) \circ (1 - z_{i,D}) \circ W_i^T \delta_{i+1,D}^{(C,D)}. \quad (16)$$

Correspondingly, the gradient of the loss function with respect to an intermediate weight matrix $W_i$, $i = 2, \ldots, N-1$, can be computed as:

$$\frac{\partial L(\Lambda)}{\partial W_i} = \sum_j \alpha_j \frac{\partial \Delta_j}{\partial W_i}, \quad (17)$$

where $$\frac{\partial \Delta_j}{\partial W_i}$$

is equal to:

$$(\delta_{i,C}^{(C,D^+)} z_{i-1,C}^T + \delta_{i,D^+}^{(C,D^+)} z_{i-1,D^+}^T) - (\delta_{i,C}^{(C,D_j^-)} z_{i-1,C}^T + \delta_{i,D_j^-}^{(C,D_j^-)} z_{i-1,D_j^-}^T) \quad (18)$$

The iterative solving mechanism 1002 can apply the above equations in successive backward and forward phases of analyses until the DNN accurately models the behavior expressed in the click-through data, within a desired degree of tolerance. The bias factors $b_i$ can be derived using the same approach described above.

The training system 104 can perform the above-described processing using parallel processing resources 1006. The parallel processing resources 1006 can be implemented in any manner, e.g., using hardware units, software units, or a combination thereof. For example, the training system 104 can use an architecture that is similar to that shown in FIG. 9. Each separate processing unit, in whatever manner implemented, can include a dimensionality-reduction module (DRM) for calculating a reduced-dimension vector associated with a document D, a deep structured semantic module (DSSM) for generating a document concept vector $y_D$ in the semantic space, a comparison module for generating the relevance measure R(C,D), and a softmax module for generating P(C|D). Another processing unit can generate a representation $y_C$ of the query C in the semantic space.

In the above description, to simplify explanation, the context C and each candidate document D were referred to in a generic sense. But as explained above, the context C can have multiple parts, and the document D can have multiple parts. The ranking framework 120 can generate separate concept vectors for these parts, and then form features based on any pairwise comparison of those concept vectors. To support this capability, the training system 104 can perform the above-described training operation with respect to each pairing of a particular context component with a particular document component. For example, the training system 104 can produce a first DNN that is configured to compare the text that surrounds a user's query (in a source document) with the title of each candidate document. The training system 104 can produce a second DNN that is configured to compare demographic information regarding the user with the body associated with each candidate document, and so on. In the real-time phase of operation, the ranking framework 120 can apply all such DNNs in parallel, and perform ranking based on the features provided by these DNNs.

The training system 104 can also use the equations described above to generate at least one DNN which can be used to compare the conceptual relatedness of queries to documents. The equations can be modified to perform this training task by replacing each occurrence of C (pertaining to context) with Q (pertaining to a query).

Finally, the nexus between context and documents may be exhibited in other information, that is, other than click-through data mined from click logs. In other implementations, the collection module 110 can collect such other information to produce training data, and the training system 104 can operate on that training data, instead of, or in addition to, click-through data.

B. Illustrative Processes

Figure 11:
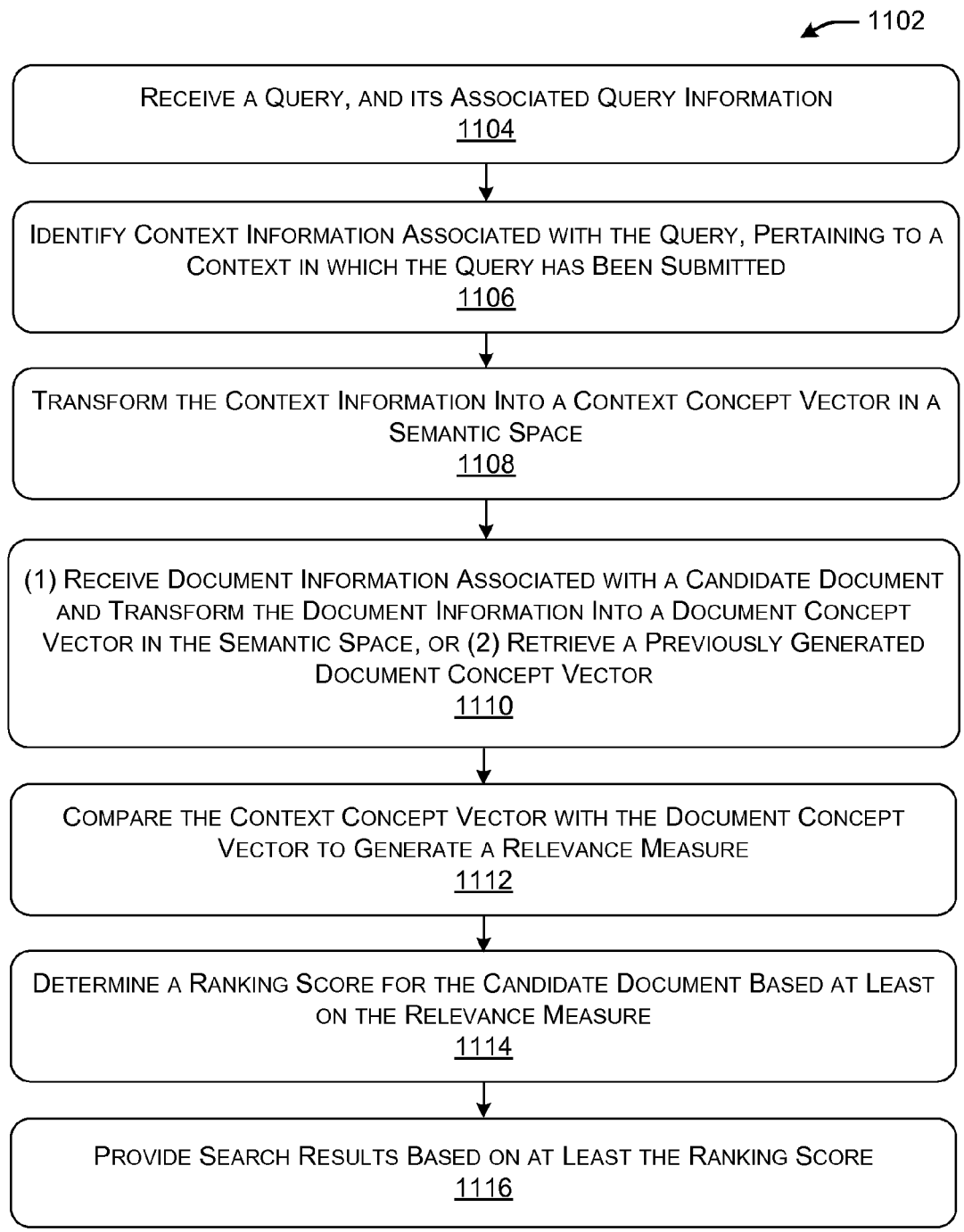
FIG. 11 is a flowchart that shows one illustrative manner of operation of the ranking framework of FIG. 2, with respect to the processing of a single document.
Figure 12:
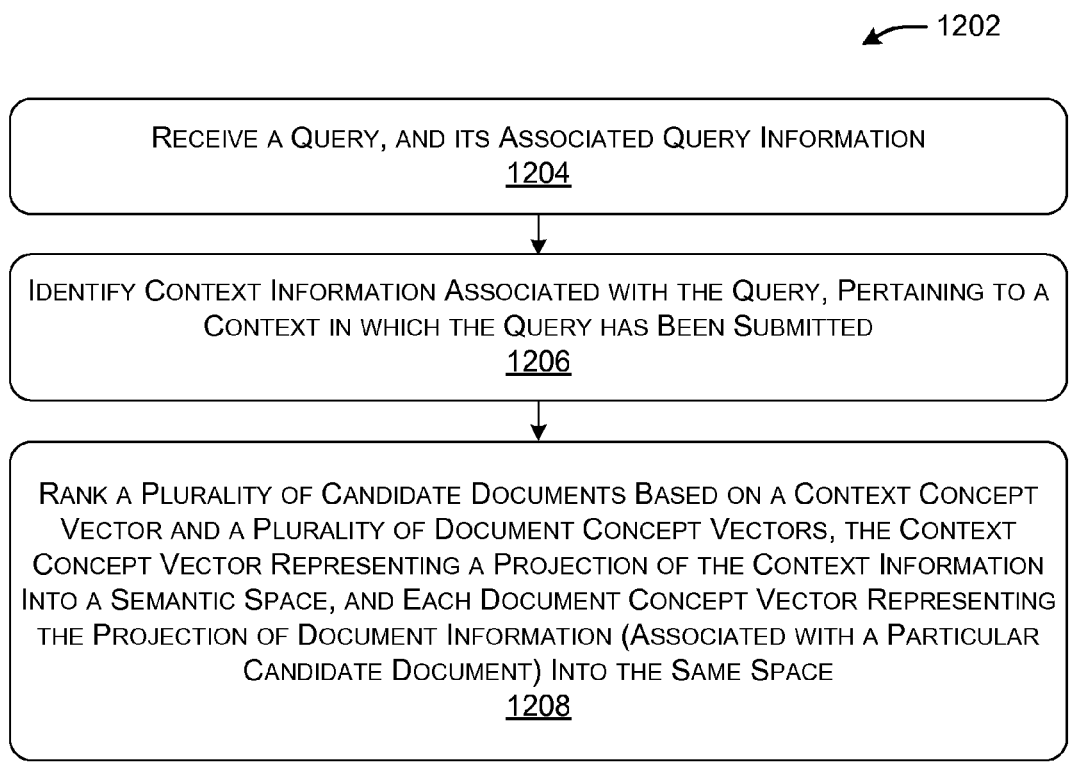
FIG. 12 is a flowchart that shows one illustrative manner of operation of the ranking framework of FIG. 2, with respect to the processing of plural documents.
Figure 13:
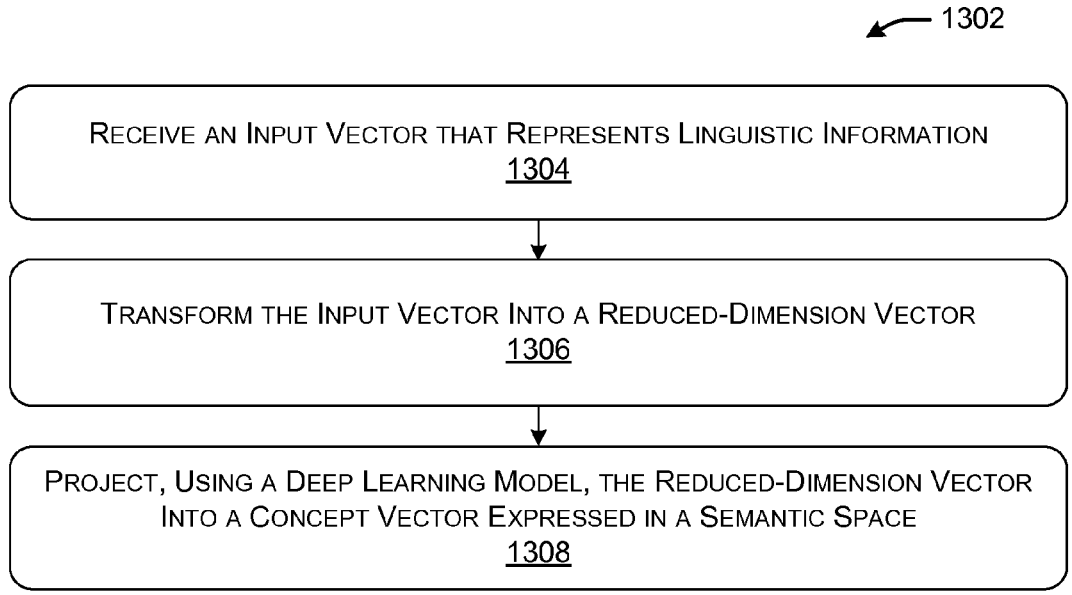
FIG. 13 is a flowchart that shows one illustrative manner of operation of the semantic transformation module of FIG. 8.

FIGS. 11-13 explain the environment 102 of FIG. 1 in flowchart form. Since the principles underlying the operation of the environment 102 have already been described in Section A, certain operations will be addressed in summary fashion in this section.

Starting with FIG. 11, this figure shows a procedure 1102 that explains one manner of operation of the ranking framework 120 of FIG. 1. Although represented in series, some operations shown in FIG. 11 can be performed in parallel. Further, some operations can be performed in offline fashion, prior to the receipt of a query. Finally, FIG. 11 shows processing performed on a single pairing of a context (associated with a query that has been submitted) and a candidate document. The ranking framework 120 may repeat these operations with respect to all candidate documents.

In block 1104, the ranking framework 120 receives a query, corresponding to query information. In block 1106, the ranking framework 120 identifies context information associated with the query. The context information describes a context in which the query has been submitted; or, more specifically, the context information describes a particular component or aspect of that context. In block 1108, the ranking framework transforms the context information into a context concept vector in a high-level semantic space, using the deep learning model 106. In block 1110, the ranking framework 120 receives document information associated with a candidate document to be considered; or, more specifically, the document information describes a particular component or aspect of the document, such as its title. The ranking framework 120 then transforms the document information into a document concept vector in the semantic space, using the deep learning model 106. Alternatively, each document concept vector can be computed in advance as part of an offline process, and then stored along with the document to which it pertains, and properly indexed to allow for later retrieval. In the real time phase of operation, upon the submission of a query, the ranking framework 120 can retrieve the previously stored document concept vector for the document under consideration, without re-computing it. In block 1112, the ranking framework 120 compares the context concept vector with the document concept vector to produce a relevance measure, reflecting a degree of a defined semantic relationship (e.g., similarity) between the context and the candidate document. In block 1114, the ranking framework 120 determines a ranking score for the candidate document based at least on the relevance measure. In block 1116, the ranking framework 120 provides a search result based on the ranking score (e.g., after all other candidate documents have been processed in a similar manner to that described above).

FIG. 12 shows a procedure 1202 that explains the operation of the ranking framework 120 in another way, here with respect to the processing of a plurality of documents. In block 1204, the ranking framework 120 receives a query, and its associated query information. In block 1206, the ranking framework 120 identifies context information associated with the query, pertaining to a context in which the query has been submitted. In block 1208, the ranking framework 120 ranks a plurality of candidate documents based on a context concept vector and a plurality of document concept vectors. The context concept vector corresponds to a projection of the context information into a high-level semantic space using a deep learning model. Each document concept vector corresponds to a projection of document information, associated with a particular candidate document, into the high-level semantic space using the deep learning model.

FIG. 13 shows a procedure 1302 that represents one manner of operation of the transformation module 202 of FIG. 7; other transformation modules in the ranking framework 120 operate in the same or similar manner. In block 1304, the dimensionality-reduction module (DRM) 702 receives an input vector that represents linguistic information, such as context information. In block 1306, the DRM 702 transforms the input item into a reduced-dimension vector, e.g., by performing n-gram hashing, random projection, or some other technique. In block 1308, the deep-structured semantic module (DSSM) 704 projects, using the model 106, the reduced-dimension item into a concept vector expressed in a semantic space.

C. Representative Computing Functionality

FIG. 14 shows computing functionality 1402 that can be used to implement any aspect of the environment 102 of FIG. 1. For instance, the type of computing functionality 1402 shown in FIG. 14 can be used to implement the training system 104, and/or any component of the search engine 112, and/or the user computing device 116, etc. In all cases, the computing functionality 1402 represents one or more physical and tangible processing mechanisms.

The computing functionality 1402 can include one or more processing devices 1404, such as one or more central processing units (CPUs), and/or one or more graphical processing units (GPUs), and so on.

The computing functionality 1402 can also include any storage resources 1406 for storing any kind of information, such as code, settings, data, etc. Without limitation, for instance, the storage resources 1406 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1402. The computing functionality 1402 may perform any of the functions described above when the processing devices 1404 carry out instructions stored in any storage resource or combination of storage resources.

As to terminology, any of the storage resources 1406, or any combination of the storage resources 1406, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1402 also includes one or more drive mechanisms 1408 for interacting with any storage resource, such as a hard disk drive mechanism, an optical disk drive mechanism, and so on.

The computing functionality 1402 also includes an input/output module 1410 for receiving various inputs (via input devices 1412), and for providing various outputs (via output devices 1414). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1416 and an associated graphical user interface (GUI) 1418. Other output devices include a printer, a model-generating mechanism, a tactile output mechanism, an archival mechanism (for storing output information), and so on. The computing functionality 1402 can also include one or more network interfaces 1420 for exchanging data with other devices via one or more communication conduits 1422. One or more communication buses 1424 communicatively couple the above-described components together.

The communication conduit(s) 1422 can be implemented in any manner, e.g., by a local area network, a wide area network (e.g., the Internet), point-to-point connections, etc., or any combination thereof. The communication conduit(s) 1422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1402 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by one or more computing devices, for performing a search, comprising:
   receiving a query, and associated query information;
   identifying context information associated with the query, pertaining to a context in which the query has been submitted, the context having a plurality of parts;
   transforming the context information into a plurality of context concept vectors in a semantic space, using a deep learning model, each context concept vector representing one of the plurality of parts of the context;
   receiving document information associated with a document, the document having a plurality of parts;
   transforming the document information into a plurality of document concept vectors in the same semantic space, using the deep learning model, each document concept vector representing one of the plurality of parts of the document;
   performing pairwise comparisons of the context concept vectors with the document concept vectors to produce a relevance measure, indicating a degree of a defined semantic relationship between the context and the document;
   determining a ranking score for the document based at least on the relevance measure; and
   providing a search result based on the ranking score.

2. The method of claim 1, further comprising:
   repeating said receiving a query, identifying context information, transforming the context information, receiving document information or a previously generated document concept vector, comparing, and determining for a plurality of documents, to generate a plurality of ranking scores for the documents; and
   ranking the documents based on the ranking scores.

3. The method of claim 2, further comprising identifying the plurality of documents based on the query, in a preliminary ranking operation.

4. The method of claim 1, wherein the document pertains to an entity, and wherein the document information describes at least one aspect of the entity.

5. The method of claim 1, wherein the context information describes textual content in proximity to the query, within a source document.

6. The method of claim 1, wherein the context information describes at least one demographic characteristic associated with a user who has submitted the query.

7. The method of claim 1, wherein the context information describes prior behavior exhibited by a user who has submitted the query.

8. The method of claim 7, wherein the prior behavior describes previous queries submitted by the user and/or previous search selections made by the user.

9. The method of claim 1, wherein the context information describes a current location of a user who has submitted the query.

10. The method of claim 1, wherein the context information describes a time at which the query has been submitted.

11. The method of claim 1, wherein the ranking score for the document is also generated based on the context concept vector and/or the document concept vector.

12. The method of claim 1, further comprising transforming the query information into a query concept vector in the semantic space, using the deep learning model, wherein the ranking score for the document is further based on the query concept vector.

13. The method of claim 1, wherein the deep learning model is a multilayered neural network.

14. The method of claim 1, wherein each of said transforming operations comprises, with respect to an input vector associated with the context information or the document information:
    transforming the input vector into a reduced-dimension vector; and
    projecting, using a multilayered-neural network, the reduced-dimension vector into a concept vector, the concept vector being associated with either the context concept vector or the document concept vector.

15. The method of claim 1, wherein the deep learning model is trained using click-through data such that a conditional likelihood of clicked documents, given respective contexts, is maximized, and the conditional likelihood of un-clicked documents, given the respective contexts, is reduced.

16. A computer readable storage device for storing computer readable instructions, the computer readable instructions when executed by one or more processing devices perform a method for providing a ranking framework, the method comprising:

receiving a query and associated query information;

identifying context information associated with the query, pertaining to a context in which the query has been submitted, the context having a plurality of parts;

transforming the context information into a plurality of context concept vectors in a semantic space, using a deep learning model, each context concept vector representing one of the plurality of parts of the context;

receiving document information associated with a document, the document having a plurality of parts;

transforming the document information into a plurality of document concept vectors in the same semantic space, using the deep learning model, each document concept vector representing one of the plurality of parts of the document;

performing pairwise comparisons of the context concept vectors with the document concept vectors to produce a relevance measure, indicating a degree of a defined semantic relationship between the context and the document;

determining a ranking score for the document based at least on the relevance measure; and providing a search result based on the ranking score.

17. The computer readable storage device of claim 16, wherein determining a ranking score for the document comprises determining a ranking score for the document based on the context concept vector and/or the document concept vector.

18. The computer readable storage device of claim 16, wherein the deep learning model is a multilayered neural network.

19. At least one computing device which implements a search engine, comprising:

a processor; and executable instructions operable by the processor, the executable instructions comprising a method for performing a search, the method comprising:

receiving a query and associated query information;

identifying context information associated with the query, pertaining to a context in which the query has been submitted, the context having a plurality of parts;

transforming the context information into a plurality of context concept vectors in a semantic space, using a deep learning model, each context concept vector representing one of the plurality of parts of the context;

receiving document information associated with a document, the document having a plurality of parts;

transforming the document information into a plurality of document concept vectors in the same semantic space, using the deep learning model, each document concept vector representing one of the plurality of parts of the document;

performing pairwise comparisons of the context concept vectors with the document concept vectors to produce a relevance measure, indicating a degree of a defined semantic relationship between the context and the document;

determining a ranking score for the document based at least on the relevance measure; and providing a search result based on the ranking score.

20. The at least one computing device of claim 19, wherein the deep learning model is a deep neural network.

* * * * *